(12) United States Patent
Taneja et al.

(10) Patent No.: US 12,375,271 B2
(45) Date of Patent: Jul. 29, 2025

(54) METHOD AND APPARATUS FOR TRUE RANDOM NUMBER GENERATION WITHIN CRYPTOGRAPHIC HARDWARE

(71) Applicant: NATIONAL UNIVERSITY OF SINGAPORE, Singapore (SG)

(72) Inventors: Sachin Taneja, Singapore (SG); Massimo Alioto, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 269 days.

(21) Appl. No.: 18/042,412

(22) PCT Filed: Aug. 13, 2021

(86) PCT No.: PCT/SG2021/050474
§ 371 (c)(1),
(2) Date: Feb. 21, 2023

(87) PCT Pub. No.: WO2022/039671
PCT Pub. Date: Feb. 24, 2022

(65) Prior Publication Data
US 2023/0327868 A1 Oct. 12, 2023

(30) Foreign Application Priority Data
Aug. 21, 2020 (SG) .......................... 10202008065R

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01)

(58) Field of Classification Search
CPC ..... H04L 9/0869; G06F 7/588; G06F 21/602; G06F 1/08; G09C 1/00
See application file for complete search history.

(56) References Cited

U.S. PATENT DOCUMENTS

| 9,335,972 B2 | 5/2016 | Yang |
| 9,928,036 B2 | 3/2018 | Mathew |

(Continued)

FOREIGN PATENT DOCUMENTS

CN 111259419 A 6/2020

OTHER PUBLICATIONS

Extended Search Report issued in corresponding European Patent Application No. 21858717.8 on Jul. 22, 2024, consisting of 10 pp.

(Continued)

*Primary Examiner* — Sangseok Park
(74) *Attorney, Agent, or Firm* — Volpe Koenig

(57) ABSTRACT

A method of generating true random numbers for use by a cryptographic hardware component for cryptographic algorithms or communication protocols, and a cryptographic hardware component for cryptographic algorithms or communication protocols. The method comprises the steps of controlling a clock pulsewidth, PW, for pulsed-latch clocking in the cryptographic hardware component to switch between using the cryptographic hardware component to generate the true random numbers in a first operating state; and using the cryptographic hardware component for cryptographic processing in a second operating state.

20 Claims, 23 Drawing Sheets

(56) References Cited

U.S. PATENT DOCUMENTS

| | | | |
|---|---|---|---|
| 2005/0005156 | A1 | 1/2005 | Harper |
| 2007/0294776 | A1 | 12/2007 | Ikake |
| 2010/0281088 | A1* | 11/2010 | Wilber .................. G06F 7/588 |
| | | | 708/251 |
| 2012/0134495 | A1 | 5/2012 | Liu |
| 2012/0233233 | A1 | 9/2012 | Chandra |
| 2019/0305970 | A1 | 10/2019 | Satpathy |
| 2020/0401534 | A1* | 12/2020 | Nardi .................... G06F 21/79 |

OTHER PUBLICATIONS

Taneja Sachin et al. "Fully Synthesizable All-Digital Unified Dynamic Entropy Generation, Extraction, and Utilization Within the Same Cryptographic Core", Aug. 18, 2020, pp. 1-4, XP093184743. https://scholarbank.nus.edu.sg/handle/10635/172972. <<retrieved Jul. 11, 2024>>.

"Fully-Synthesizable All-Digital Unified Dynamic Entropy Generation, Extraction and Utilization in a Cryptographic Core for Constrained Secure Systems | ScholarBank@NUS", Aug. 18, 2020, pp. 1-2, XP093184747. https://batavia.internal.epo.org/citenpl/citation/prod/pdf/5eef6b7d-a7d4-3f37-aec4-289156730cfd.pdf. <<retrieved Jul. 11, 2024>>.

Satpathy Sudhir et al. "An All-Digital Unified Physically Unclonable Function and True Random Number Generator Featuring Self-Calibrating Hierarchical Von Neumann Extraction in 14-nm Tri-gate CMOS", IEEE Journal of Solid-State Circuits, IEEE, USA, vol. 54, No. 4, Apr. 20, 2019, pp. 1074-1085, XP011716787, ISSN: 0018-9200, DOI: 10.1109/JSSC.2018.2886350. << retrieved Mar. 26, 2019>>.

Verbauwhede, J. Balasch, S. S. Roy and A. Van Herrewege, "Circuit challenges from cryptography," in ISSCC Dig. Tech. Papers, Feb. 2015, pp. 1-2.

C. Paar, J. Pelzl, Understanding Cryptography, Springer, 2010, p. Nos. 34 to 41.

S. K. Satpathy et al., "An All-Digital Unified Physically Unclonable Function and True Random Number Generator Featuring Self-Calibrating Hierarchical Von Neumann Extraction in 14-nm Tri-gate CMOS," in IEEE Journal of Solid-State Circuits, vol. 54, No. 4, pp. 1074-1085, Apr. 2019.

V. R. Pamula, X. Sun, S. Kim, F. U. Rahman, B. Zhang, V. S. Sathe, "An All-Digital True-Random-No. Generator with Integrated Decorrelation and Bias Correction at 3.2-to-86 Mb/S, 2.58 pJ/Bit in 65-NM CMOS," 2018 IEEE Symposium on VLSI Circuits, Honolulu, HI, 2018, pp. 1-2.

M. Kim, U. Ha, K. J. Lee, Y. Lee, H .- J. Yoo, "A 82-nW Chaotic Map True Random Number Generator Based on a Sub- Ranging Sar Adc," in IEEE Journal of Solid-State Circuits, vol. 52, No. 7, pp. 1953-1965, Jul. 2017.

E. Kim, M. Lee, J. Kim, "8Mb/s 28Mb/mJ robust true-random-number generator in 65nm CMOS based on differential ring oscillator with feedback resistors," in ISSCC Dig. Tech. Papers, Feb. 2017, pp. 144-145.

K. Yang, D. Blaauw and D. Sylvester, "An All-Digital Edge Racing True Random Number Generator Robust Against PVT Variations," in IEEE Journal of Solid-State Circuits, vol. 51, No. 4, pp. 1022-1031, Apr. 2016.

K. Yang, D. Fick, M. B. Henry, Y. Lee, D. Blaauw and D. Sylvester, "16.3 A 23Mb/s 23pJ/b fully synthesized true-random-number generator in 28nm and 65nm CMOS," in ISSCC Dig. Tech. Papers, Feb. 2014, pp. 280-281.

S. K. Mathew et al., "μ Rng: A 300-950 mV, 323 Gbps/W All-Digital Full-Entropy True Random Number Generator in 14 nm FinFET CMOS," in IEEE Journal of Solid-State Circuits, vol. 51, No. 7, pp. 1695-1704, Jul. 2016.

L. E. Bassham, A. L. Rukhin, J. Soto et al., "A Statistical Test Suite for Random and Pseudorandom Number Generators for Cryptographic Applications," NIST Special Publication 800-22A, 2010.

M. S. Turan, E. Barker, J. Kelsey et al., "Recommendation for the Entropy Sources Used for Random Bit Generation," NIST Special Publication 800-90B, 2018.

N. Weste, D. Harris, CMOS VLSI Design (4th edition), Pearson Education 2011.

H. Cramer, Mathematical Methods of Statistics. Princeton, NJ, USA: Princeton Univ. Press, 1946, ISBN 0-691-08004-6, p. No. 282, second paragraph.

S. T. Chandrasekaran, V. E. G. Karnam and A. Sanyal, "0.36-mW, 52-Mbps True Random Number Generator Based on a Stochastic Delta-Sigma Modulator," IEEE Solid-State Circuits Letters, vol. 3, pp. 190-193, Mar. 2020.

* cited by examiner

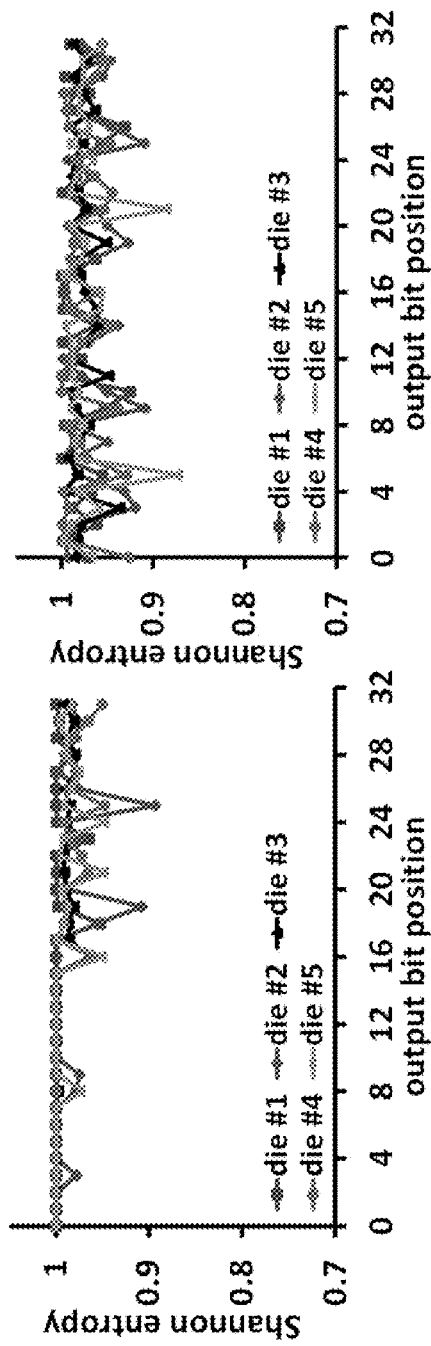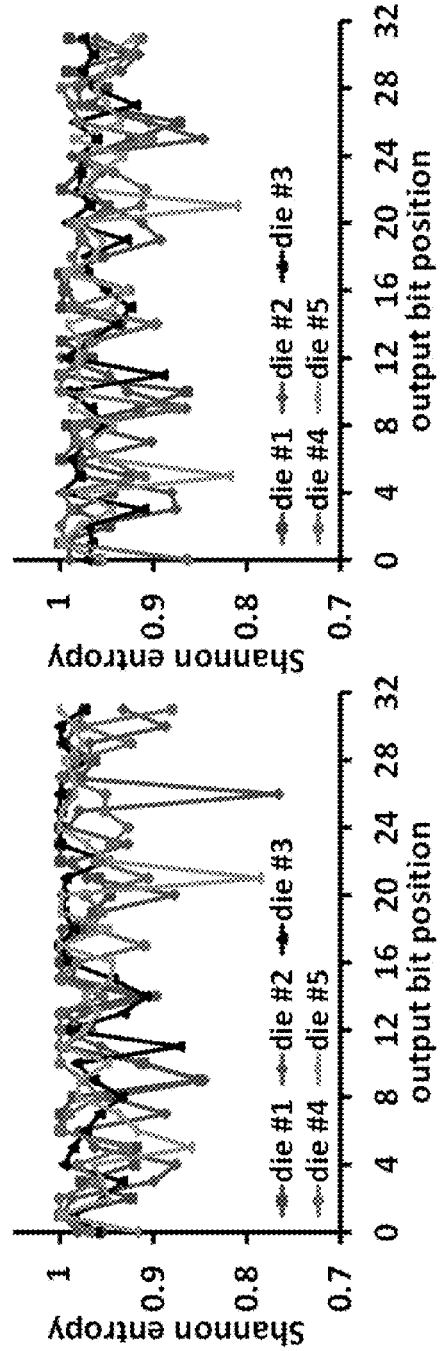
Figure 10(a) Figure 10(b) Figure 10(c) Figure 10(d)

(a)                                    (b)

TABLE I. COMPARISON TABLE (BEST PERFORMANCE AND FAVORABLE FEATURE IN BOLD)

| | This work | SSC-L 2020 [17] | JSSC 2019 [3] | VLSI 2018 [4] | JSSC 2017 [5] | ISSCC 2017 [6] | JSSC 2016 [!Reference source not found.] | JSSC 2016 [7] |
|---|---|---|---|---|---|---|---|---|
| technology (nm) | 40 | 65 | 14 | 65 | 180 | 65 | 14 | 40 |
| entropy source [a] | M + J | J | M | M | CM | J | M | J |
| calibration | NO | NO | YES | YES | NO | NO | YES | YES |
| all-digital | YES | NO | YES | YES | NO | NO | YES | YES |
| synthesizable | YES | NO | NO | NO | NO | NO | NO | NO |
| $V_{DD}$ (V) | 0.7 - 1.1 | 0.8 - 1.2 | 0.55 - 0.75 | 0.53 - 1.0 | 0.6 - 0.9 | 1.08 - 1.2 | 0.3 - 0.95 | 0.6 - 0.9 |
| temperature (°C) | -25 - 100 | -20 - 70 | 70 | -20 - 100 | - | - | - | -40 - 120 |
| # tested wafer lots | 2 | - | - | - | - | - | - | - |
| area ($10^6 \cdot F^2$) (unified)[b] | 0.43 (YES) | 14.2 (YES) | 10.8 (YES) | 2.4 (NO) | 6.5 (YES) | 0.22 (NO) | 5.55 (NO) | 0.52 (NO) |
| minimum energy (pJ/bit) | 2.5[c] @ 0.7 V | 6.9 @ 0.9 V | 2.5 @ 0.65 V | 2.58 @ 0.53 V | 0.3 @ 0.6 V | 35.5 @ 1.08 V | 3.1 @ 0.4 V | 11 @ 0.6 V |
| energy efficiency (Tbps/W)[d] | 0.4 | 0.145 | 0.4 | 0.388 | 3.33 | 0.028 | 0.323 | 0.091 |
| max. throughput (Mbps)[d] | 128 | 52 | 1,480 | 86 | 0.27 | 9.9 | 225 | 2 |
| area efficiency (Mbps/$10^6 \cdot F^2$) | 299 | 3.66 | 137 | 35.8 | 0.04 | 45 | 40.5 | 3.82 |
| NIST 800-90B IID test pass | 100% | 100% | - | 100% | - | - | - | - |
| inherent obfuscation | YES | NO | NO | NO | NO | NO | NO | NO |
| frequency attack robustness | YES (0.3 V)[e] | YES (0.19 V) | N/A | N/A | N/A | YES (0.4 V) | N/A | YES (0.5 V) |
| unified functions | TRNG + crypto | TRNG + ADC | TRNG + PUF | - | TRNG + ADC | - | - | - |

[a]. Entropy source (M - metastability, J - jitter, CM - chaotic map)
[b]. Area includes the unified functions, [3] requires 750 additional gates on off-chip FPGA for entropy extraction
[c]. XOR-based entropy extractor accounts for 0.2% energy and $0.02 \cdot 10^6$ $F^2$ area overhead (off-chip). The clock generator is invariably ignored in the literature and hence not considered in this table.

Figure 21

METHOD AND APPARATUS FOR TRUE RANDOM NUMBER GENERATION WITHIN CRYPTOGRAPHIC HARDWARE

FIELD OF INVENTION

The present invention relates broadly to method and apparatus for true random number generation within cryptographic hardware, and in particular to fully-synthesizable all-digital unified dynamic entropy generation, extraction and utilization within the same cryptographic core (i.e., unified TRNG and cryptographic core).

BACKGROUND

True random number generators (TRNGs) are very important components in secure systems on chip working as source of dynamic entropy (unpredictable sequence of random digital bits) [1]-[2]. TRNG output is post processed to meet cryptographic key quality standards and serves as key for the private- or symmetric-key encryption widely used to protect data communication over insecure channel [2]. Traditionally these two building blocks within single or different subsystems are separately designed with different design methodologies and integrated together during system design leading to higher silicon area, cost and design effort. The two building blocks typically communicate over bus-based or hard-wired interconnect, making them prone to physical attacks (e.g., micro-probing).

However, the adoption of TRNGs in low-cost and power-constrained devices requires architectures with low area, energy/bit and design effort [1]-[12]. This has driven a wider interest in TRNGs with limited or no analog design [3]-[4], and unifying multiple functions within the same circuitry (e.g., TRNG with Physically Unclonable Function [3] and data converter [5]). However, such existing TRNGs require separate raw entropy generation circuitry, its extraction via post-processing, and the cryptographic core utilizing such entropy. This prevents area sharing opportunities and offers obvious targets in physical attacks [1].

TRUE RANDOM NUMBER GENERATOR [8] (The Regent of the University of Michigan, US, 2014), U.S. Pat. No. 9,335,972 B2. This patent proposes a method for true random number generator based on 3-edge ring oscillator phase inversion time from third harmonic to first harmonic. The phase inversion time converted into digital count using the phase detection circuit serves as random number exploiting the jitter as source of randomness. This method is also published as conference paper in *IEEE International Solid-State Circuits Conference* [9].

RANDOM NUMBER GENERATOR [10] (Intel Corporation, Santa Clara US, 2014), U.S. Pat. No. 9,928,036 B2. This patent proposed a method to generate random number execution unit coupled with processor. Random numbers are generated utilizing the thermal noise in a metastability based source. The execution unit includes entropy source circuits, correlation circuits, and an extractor circuit. The entropy source circuits include all-digital components and are to generate an initial randomized bit stream. This method is also described in *IEEE Journal of Solid-State circuits* [11].

APPARATUS AND METHOD FOR GENERATING HYBRID STATIC/DYNAMIC ENTROPY PHYSICALLY UNCLONABLE FUNCTION [12] (Intel Corporation, Santa Clara US, 2019), US Pat. No. US 2019/0305970 A1. This patent proposed a unified method and apparatus for generation of physically unclonable function (PUF) and true random number generator (TRNG). An apparatus is provided which comprises: an entropy source to produce a first random sequence of bits, wherein the entropy source comprises an array of bi-stable cross coupled inverter cells; a first circuitry coupled to the entropy source, wherein the first circuitry to generate an entropy source selection set; and a second circuitry coupled to the entropy source and the first circuitry, wherein the second circuitry is to receive the first random sequence and the entropy source selection set, and wherein the second circuitry is to generate a second random sequence. This method is also extended in *IEEE Journal of Solid-State circuits* [3].

In summary, existing architectures such as [3]-[12] only proposed efficient true random number generation apparatus based on various randomness phenomena (e.g., metastability, jitter, chaos etc.). These architectures have separate hardware resources dedicated for random number generation and cryptographic hardware, i.e., they employ separate circuitry for entropy generation, entropy extraction and its utilization for encryption by cryptographic hardware, leading to an additive area and energy cost that is generally dominated by the TRNG. Standalone entropy generation and extraction also expose the secret keys to physical attacks (e.g., bus microprobing), due to the physical separation from the cryptographic core. While in pursuing area savings, unified architectures have been recently proposed to merge the TRNG with other functions, such as physically unclonable functions, and data converters, such existing proposals do not cover the entire signal chain from key generation to encrypted data.

Embodiments of the present invention seek to address at least one of the above problems.

SUMMARY

In accordance with a first aspect of the present invention, there is provided a method of generating true random numbers for use by a cryptographic hardware component for cryptographic algorithms or communication protocols, the method comprising the steps of:
controlling a clock pulsewidth, PW, for pulsed-latch clocking in the cryptographic hardware component to switch between using the cryptographic hardware component to generate the true random numbers in a first operating state; and
using the cryptographic hardware component for cryptographic processing in a second operating state.

In accordance with a second aspect of the present invention, there is provided a cryptographic hardware component for cryptographic algorithms or communication protocols, cryptographic hardware component configured for controlling a clock pulsewidth, PW, for pulsed-latch clocking in the cryptographic hardware component to switch between using the cryptographic hardware component to generate true random numbers in a first operating state, and using the cryptographic hardware component for cryptographic processing in a second operating state.

In non-limiting example embodiments described herein, the cryptographic hardware component comprises a symmetric key encryption core for private-key or symmetric-key algorithms. It is noted that the present invention will be applicable for any general cryptographic hardware with minor modification, as will be appreciated by a person skilled in the art. Accordingly, cryptographic hardware component according to the above aspects of the present invention includes private-key cryptographic core, hash functions etc.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 10(a) shows measured raw output Shannon entropy versus bit position across five dice (dice #1-3 from first lot and dice #4-5 from second lot) under nominal conditions (0.9 V, 25° C.) with PW=64 F01, according to an example embodiment.

FIG. 10(b) shows measured raw output Shannon entropy versus bit position across five dice (dice #1-3 from first lot and dice #4-5 from second lot) under nominal conditions (0.9 V, 25° C.) with PW=256 F01, according to an example embodiment.

FIG. 10(c) shows measured raw output Shannon entropy versus bit position across five dice (dice #1-3 from first lot and dice #4-5 from second lot) under worst-case conditions (0.8 V, −25° C.) with PW=64 F01, according to an example embodiment.

FIG. 10(d) shows measured raw output Shannon entropy versus bit position across five dice (dice #1-3 from first lot and dice #4-5 from second lot) under worst-case conditions (0.8 V, −25° C.) with PW=256 F01, according to an example embodiment.

FIG. 21 shows a table illustrating a comparison of an example embodiment with existing TRNGs.

DETAILED DESCRIPTION

Embodiments of the present invention can provide a fully-synthesizable all-digital unified architecture for dynamic entropy generation, extraction and utilization (FIGS. 1-2), empowering cryptographic cores with the ability to 1) generate endogenous randomness via pulse overstretching in pulsed-latch clocking, 2) extract entropy simultaneously and in-situ via inherent Shannon confusion and diffusion in symmetric-key cryptographic cores, 3) utilize the same core (i.e., area) for symmetric-key encryption under regular clock pulsewidth with random number generated as key.

Based on automated standard cell design, the architecture according to example embodiments exhibits very low design effort, easy technology porting/scaling, data locality between entropy generation and utilization (i.e., preventing memory and bus physical attacks), and inherent physical-level obfuscation against physical attacks, specifically being more robust against probing or Focused Ion Beam (FIB) attacks, i.e. standard-cell TRNG/crypto scattered, target signals harder to identify, no obvious attack target.

Example embodiments of the present invention combine the random number generation inside the cryptographic hardware resulting in better performance and security. Example embodiments of the present invention can also achieve a comparable performance of both the building blocks while providing many unique capabilities as combined building block for secure systems.

Proposed Unified Dynamic Entropy Architecture According to Example Embodiments

Figures 1A, 1B:
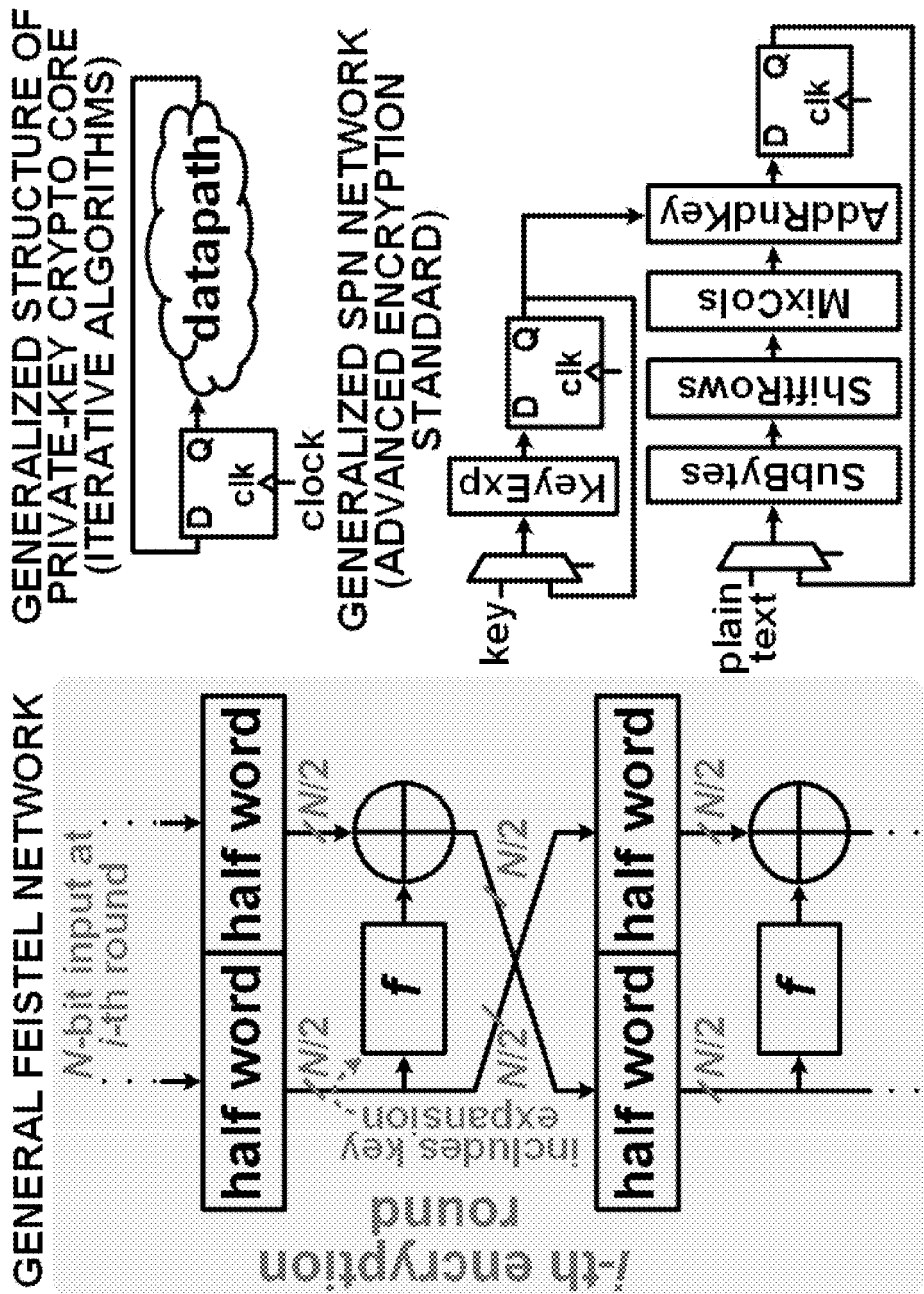
FIG. 1(a) shows an in-principle microarchitecture for private-key cipher algorithms based on Feistel network.
FIG. 1(b) shows an in-principle microarchitecture for private-key cipher algorithms based on Substitution-permutation network (e.g., Advanced Encryption Standard) implementation.

For the unified architecture according to an example embodiment, the inventors have recognized from a fundamental observation on the popular class of Feistel cryptographic algorithms (e.g., SIMON, SMS4, CLEFIA), schematically illustrated in FIG. 1(a), substitution-permutation networks (SPN), schematically illustrated in FIG. 1(b), that their highly regular datapath invariably has well delay-balanced paths, and contains 50% inverting combinational logic in sequential loops (as set by the Shannon confusion and diffusion requirement in any cryptographic algorithm [2]). This observation holds for the majority of existing classes of ciphers (e.g., AES, PRESENT), with the exception of area-hungry implementations based on fully-unrolled microarchitectures (i.e., no loops).

Figure 1C:
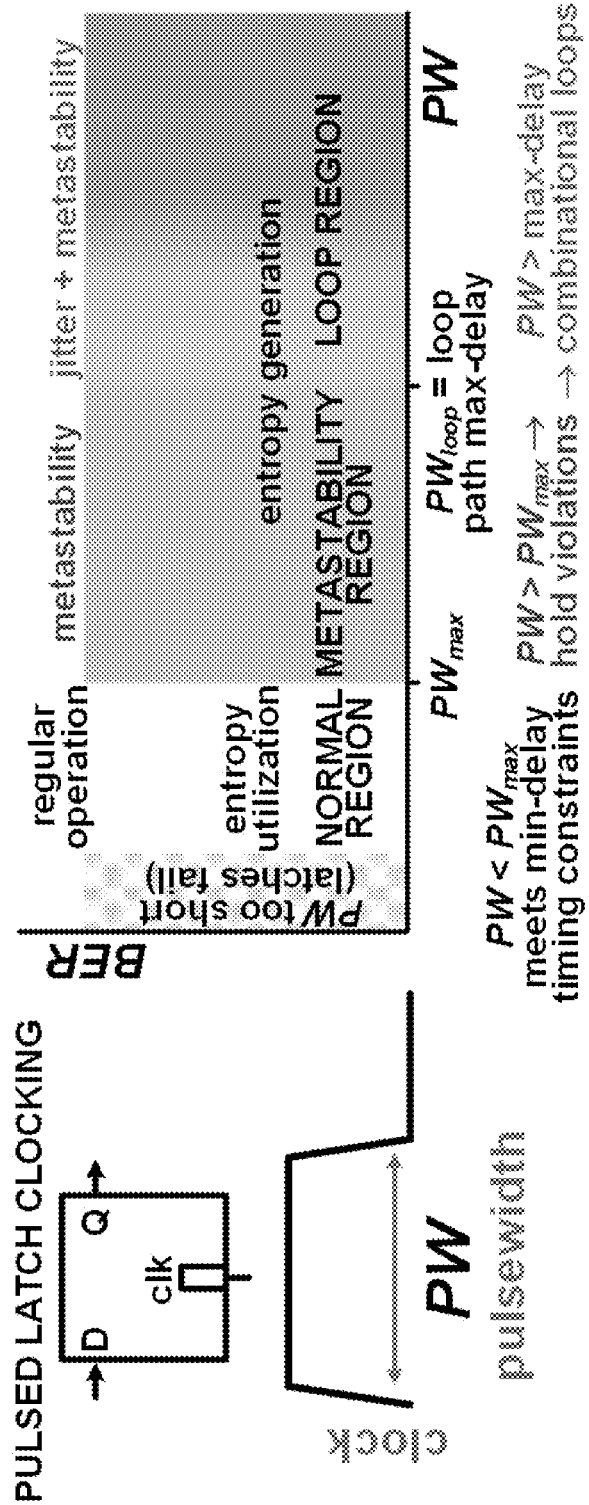
FIG. 1(c) illustrated pulsed-latch clocking-based unified entropy architecture according to an example embodiment.

The unified architecture according to an example embodiment adopts pulsed latch-based clocking, whose clock pulsewidth PW provides a run-time knob to induce or suppress hold failures (FIG. 1(c)). When PW is lower than the maximum $PW_{max}$ allowed by the hold constraint, conventional encryption is performed to utilize the previously generated entropy ("normal region", FIG. 1(c)). It is noted that PW smaller than $PW_{min}$ ("PW too short", FIG. 1(c)) leads to functional failure (insufficient clock to output delay, as will be appreciated by a person skilled) of pulsed latch based sequential elements. $PW > PW_{max}$ allows dynamic entropy generation by harnessing hold-induced metastability, and additional jitter in inverting combinational loops.

More specifically, the architecture according to an example embodiment adopts pulsed latch clocking, whose clock pulsewidth PW is used as a run-time knob. Min-delay (i.e., hold time) violations are induced via metastability and/or jitter in inverting combinational loops, by keeping pulsed latches transparent for a sufficiently long time (i.e., over-stretching PW). As further benefit, the adoption of pulsed latches as sequential elements results in lower area and energy compared to flip-flops for the implementation of the cryptographic core. In the architecture according to an example embodiment, pulsed latch clocking is leveraged to turn the clock pulsewidth into a useful knob to induce min-delay violations, while maintaining the same clock frequency.

The different modes depend on the adopted PW at a given point of time, according to an example embodiment. Conventional encryption is performed when the clock pulsewidth is lower than the maximum $PW_{max}$ that prevents hold time violations, as evaluated by timing analysis at design time (see "normal region" in FIG. 1(c)). At clock pulsewidths greater than $PW_{max}$, hold violations induce metastability in sequential elements, which in turn is a highly-effective randomness source for TRNGs (see "metastability region" in FIG. 1(c)). At clock pulsewidths larger than the max-delay of combinational loops $PW_{loop}$, oscillations are triggered by the pulsed latch transparency (see "loop region" in FIG. 1(c)). The inevitable jitter in such oscillations is again a randomness source that can be exploited in a TRNG according to an example embodiment.

Figure 2A:
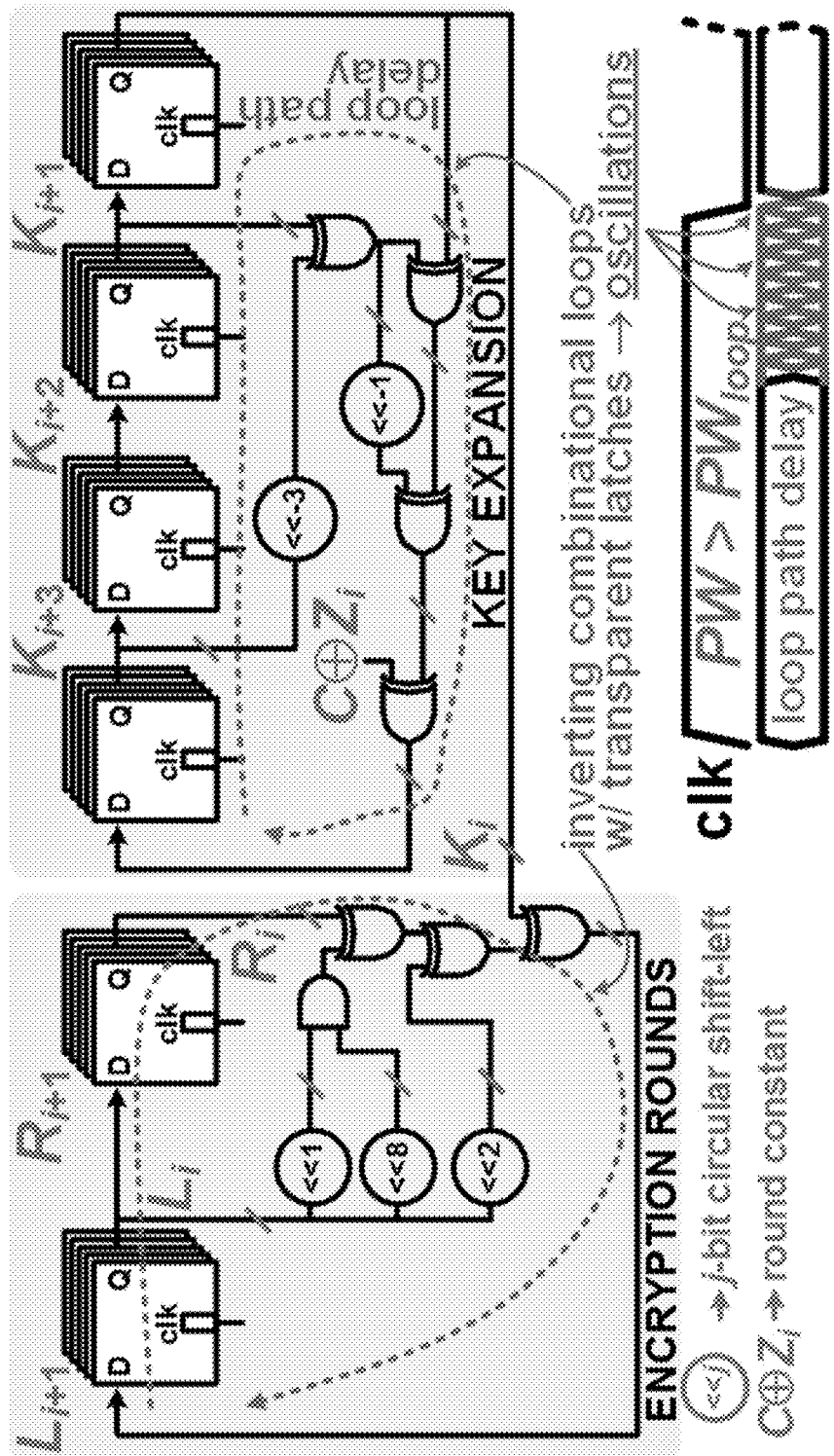
FIG. 2(a) illustrates a unified architecture for TRNG and cryptographic core (SIMON core), and inverting combinational loops responsible for self-oscillations, according to an example embodiment.

As a representative example, the round-parallel microarchitecture of the SIMON symmetric-key cryptographic core in FIG. 2(a) is used to demonstrate the proposed unified entropy approach according to an example embodiment. The architecture in FIG. 2(a) delivers 32-bit plaintext encryption with 64-bit key, and has $PW_{max}=32$ FO1 from min-delay (hold) timing analysis (FO1=inverter delay with fanout of 1).

More specifically, the unified architecture according to an example embodiment is described by starting from a conventional SIMON cipher, as private-key cryptographic core primitive with a round-parallel microarchitecture designed with pulsed latches (see FIG. 2(a)). The architecture in FIG. 2(a) delivers a 32-bit encrypted ciphertext every 32 cycles, is fed with 32-bit plaintext and 64-bit key, and computes one round per clock.

The architecture according to an example embodiment was designed with an automated standard cell design flow in 40 nm and pulsed latch clocking for a 20 FO1 nominal pulsewidth. A 12 FO1 was added as hold margin during automatic place&route to increase the combinational min-delay, resulting to $PW_{max}=32$ FO1 (FO1 is the inverter delay with a fan-out of one, which corresponds to 25 ps in 40 nm at 0.9 V and 25° C.). Such hold margin was set to keep the hold-fix buffer area cost within reasonable bounds (20%), as the latter increased at a faster rate of 2% for every additional 1 FO1 at hold margins higher than 12 FO1 (due to the higher number of paths with lower intrinsic min-delay, requiring additional hold-fix buffers [15]). On the other hand, the loop delay $PW_{loop}$ in FIG. 1(c) is upper bounded by the combinational max-delay and hence the clock cycle target used during synthesis, placement and routing.

In general, $PW_{max}$ and $PW_{loop}$ depend on the cipher algorithm, the adopted microarchitecture and the timing constraints used in an example embodiment. Regarding the timing constraints, a higher hold margin and $PW_{max}$ generally entail a larger area and energy, due to the higher number of hold-fix buffers inserted. Similarly, a smaller $PW_{loop}$ is achieved when targeting a shorter clock cycle, which in turn requires larger area and energy.

In the following subsections, the different sources of randomness (i.e., entropy generation) are discussed under the values that PW can assume in FIG. 1(c), along with the design implications set by the architecture in FIG. 2(a).

Figure 2B:
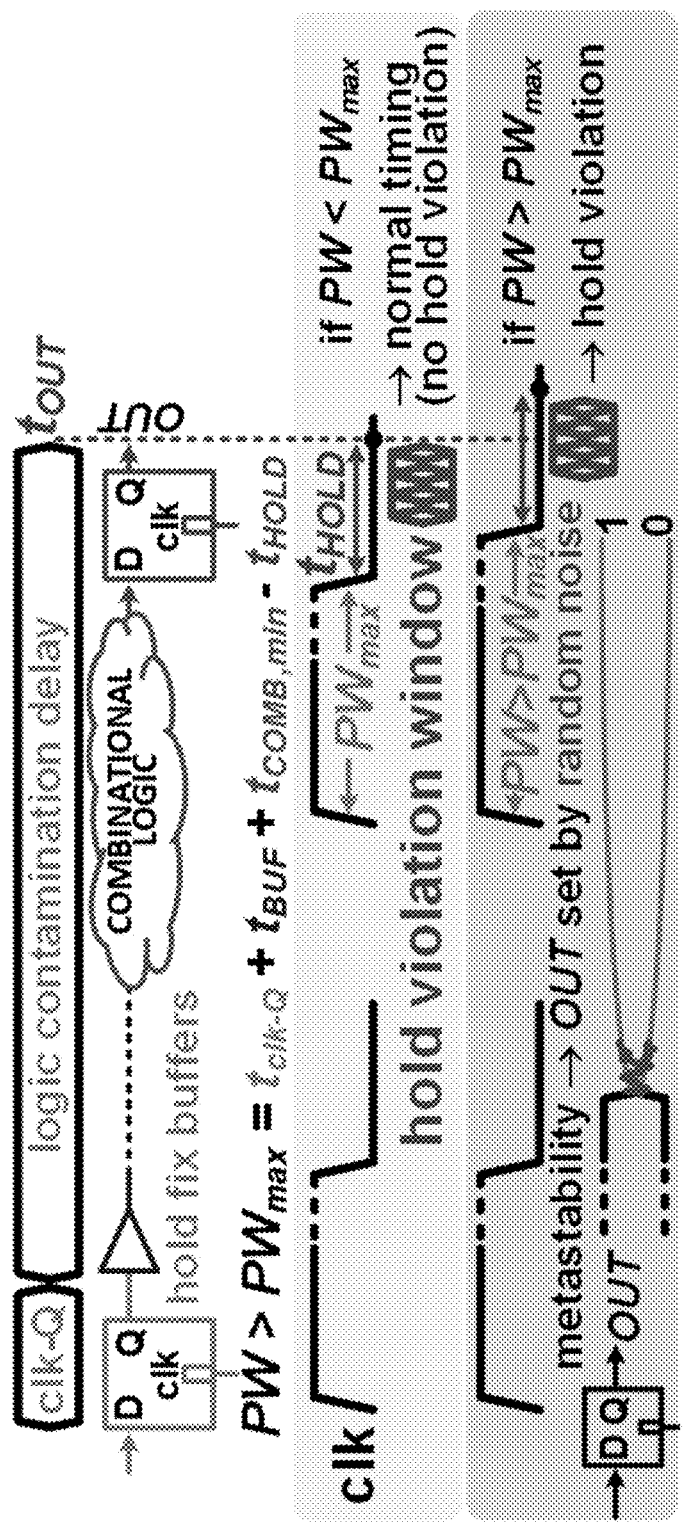
FIG. 2(b) illustrates dynamic entropy generation using hold time violations (metastability) as source of randomness, and related timing analysis of a single logic path, according to an example embodiment.

Min-Delay Metastability-Induced Entropy Generation ($PW>PW_{max}$) According to an Example Embodiment Under pulsed latch clocking, hold violations take place in a single logic path for clock pulsewidths greater than [15]

$$PW_{max}=t_{clk-Q}+t_{BUF}+t_{COMB,min}-t_{HOLD} \quad (1)$$

where $t_{clk-Q}$ is the clock-to-Q delay of the launching latch, $t_{BUF}$ is the delay of the inserted hold-fix buffers, $t_{COMB,min}$ is the contamination delay of the combinational logic, and $t_{HOLD}$ is the hold time of the capturing latch, as summarized in FIG. 2(b).

For PW>$PW_{max}$, a hold violation occurs on the capturing latch at the clock falling edge, causing metastability and hence resolving to an unpredictable output logic value due to noise (see "metastability region" in FIG. 1(c)). In this condition, the generic pipeline stage in FIG. 2(b) mimics the behavior of TRNGs based on metastability in sequential elements (i.e., latches), regardless of how the metastability has been caused.

In a single-path circuit, the above behavior would occur when PW is wide enough to make the latch input transition during the hold violation window Δ around the clock edge. In typical single-path metastability-based TRNGs, the input arrival time is carefully calibrated within the window Δ(~1 ps from circuit simulations and comparable to [11]). However, the datapath in FIG. 1(a) and its implementation in FIG. 2(b) according to an example embodiment are very rich in active logic paths being prone to hold violations, thanks to the inherent regularity and the properties of confusion and diffusion of the datapath function. For example, from FIG. 2(b) the occurrence of single transition at any latch output triggers rippling transitions in the subsequent XOR logic tree in both the key expansion (confusion) and encryption round (diffusion). In the histogram, more than 92% of the path population overlaps with another window Δ=1 ps (see FIG. 4).

Figure 3A:
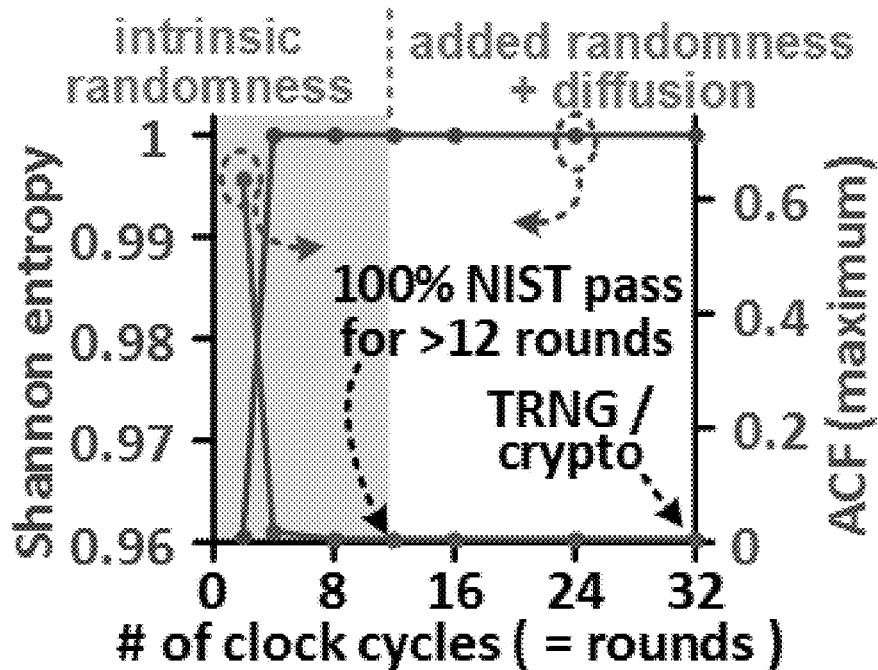
FIG. 3(a) shows measured TRNG output statistics (Shannon entropy and maximum autocorrelation function value) versus round on nominal conditions (0.9 V, 25° C.), according to an example embodiment.
Figure 4:
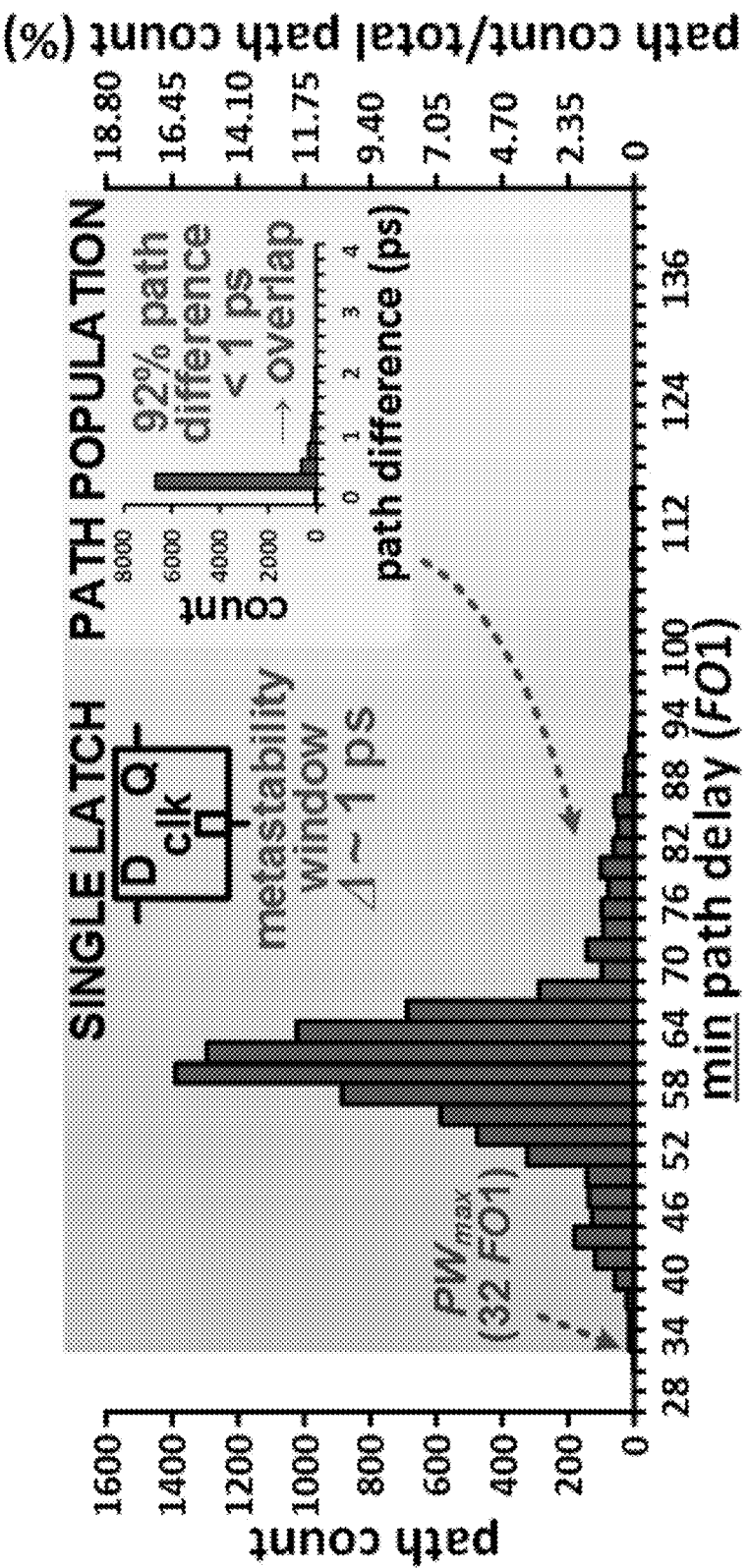
FIG. 4 shows a histogram of paths experiencing hold violations versus clock PW from post-layout static timing analysis of the implementation in FIG. 2(a), according to an example embodiment.

This explains the intrinsically high density of overlapping windows Δ, as shown by the histogram of violating paths found through post-layout static timing analysis in FIG. 4 at nominal conditions (typical, 0.9 V, 25° C.). From this figure, a very large number of paths expectedly suffer from hold violations in any time window with width Δ. The statistical distribution of the violating paths expectedly starts at PW=32 F01, and its mean is placed around 60 F01. The phenomenon is then reinforced and amplified in successive rounds (i.e., clock cycles) within the same encryption, as confusion and diffusion further spread the random effect of hold violations throughout the latch outputs (i.e., the same datapath also performs entropy extraction). Hence, the measured output quality (i.e., entropy and maximum autocorrelation function) at nominal conditions increases under a larger number of rounds within the same encryption, as shown in FIG. 3(a). From this figure, less than 12 rounds are sufficient to generate an output bitstream that passes all NIST randomness tests. The resulting number of rounds required to achieve cryptographic-grade entropy is well in line with prior art using cryptographic cores (e.g., block ciphers) in CBC-MAC mode as entropy extractors, starting from a lower-entropy entropy generated by a standalone TRNG (typically requiring less than 10, and down to 4 even under input entropy as low as 0.1). In an example embodiment, all 32 rounds per random number generation are executed when operating as a TRNG, which preserves regularity and the same cycle-level timing as its operation as cryptographic core (32 rounds, one round per cycle).

From the above considerations, the very large number of logic paths prone to hold violations effectively works as redundant entropy sources that are finally recombined using the datapath itself as an entropy extractor. This allows inherent resilience against variations and eliminates the traditional need for run-time or testing-time calibration altogether, as well as their area, energy and design effort penalty. Hence, randomness becomes available as soon as PW>$PW_{max}$, without having to tune PW for a specific value across the wide window in FIG. 4.

Figure 3B:
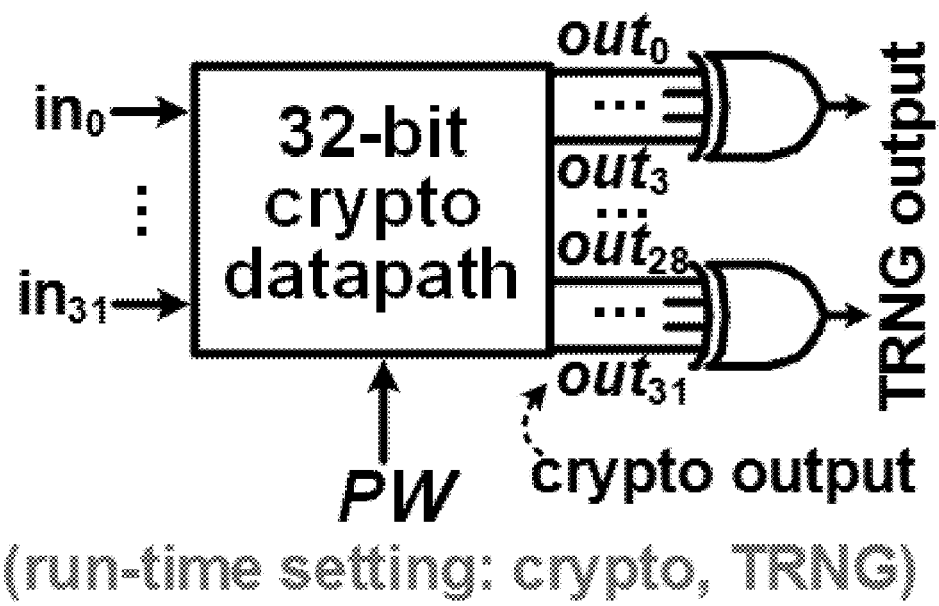
FIG. 3(b) shows 4-bit XOR based post-processing, according to an example embodiment.

It is noted that, similar to existing TRNGs, any residual architecture-dependent or mismatch-induced bias is easily suppressed by adopting a simple XOR entropy extractor at the final output. In an example embodiment, four adjacent encryption output bits are merged into a single bit through XOR to further improve the entropy, as shown in FIG. 3(b) (as will be described in more detail below).

Max-Delay Entropy Generation Via Jittered Oscillations (PW>$PW_{loop}$) According to an Example Embodiment As an additional source of randomness, keeping latches transparent for a time longer than the delay of the logic path loops in FIG. 2(a) naturally leads to self-oscillations. In detail, oscillations take place when the max-delay timing constraint is violated, and hence when PW is larger than [15]

$$PW_{loop} = t_{clk-Q} + t_{COMB,max} + t_{D-Q} \quad (2)$$

where $t_{D-Q}$ is the data-to-Q delay of the capturing latch, and $t_{COMB,max}$ is the average combinational propagation delay within the loop in adjacent rounds (i.e., signal propagating twice through logic in FIG. 2(a) results in a complete cycle). In equation (2), the $t_{COMB,max}$ delay includes the additional hold-fix buffer delay for those max-delay critical paths overlapping with min-delay critical paths. As relevant to the "loop region" in FIG. 1(c), the generic pipeline stage in FIG. 2(b) mimics the behavior of TRNGs based on ring oscillators or similar variants (e.g., Fibonacci or Galois ring oscillator). In particular, the inevitable presence of jitter introduces randomness in the logic value being sampled at the falling clock edge, and induces timing violations around it. In the specific SIMON architecture in FIG. 2(a) according to an example embodiment, jittered loop oscillations take place in the encryption rounds, where randomness is also injected by the jittery oscillations and the random values generated in key expansion.

Figure 5:
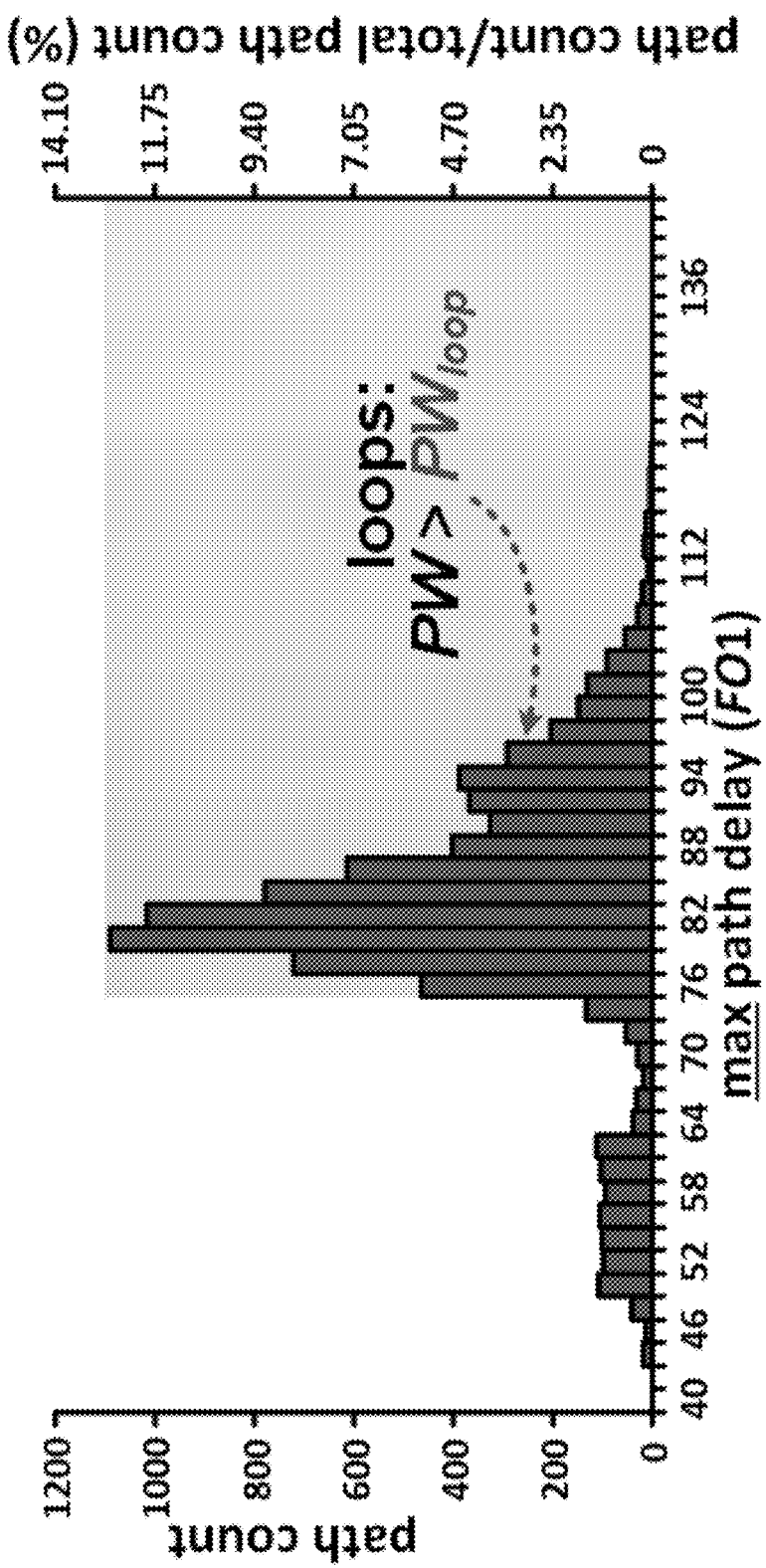
FIG. 5 shows a histogram of paths experiencing setup violations versus clock PW from post-layout static timing analysis of the implementation in FIG. 2(a), according to an example embodiment.

A very large number of paths expectedly experience timing violations regardless of the specific PW, as oscillations occur at any PW>$PW_{loop}$ and considering that 50% of the loop paths in FIGS. 1(a)-(b) and 2(a) are inherently inverting. This is confirmed by the histogram in FIG. 5 obtained from static timing analysis at nominal conditions (typical, 0.9 V, 25° C.), which shows that the mean path max-delay is 80 F01. Again, this mechanism avoids the need for PW tuning or calibration.

The internal nodes oscillating inside the cryptographic core are affected by both the cycle-to-cycle and the accumulated jitter. The latter increases with the number of oscillations, whereas the former does not. Therefore, larger PW make accumulated jitter more significant, and eventually dominant at very large pulsewidths (in the order 1,000 F01, from experiments described below). Overall, the randomness generated by jittery oscillations adds to the independent source associated with hold violations described above ("Min-Delay Metastability-Induced Entropy Generation (PW>$PW_{max}$) according to an example embodiment"). Being latch input sampling asynchronous and jittered with respect to loop oscillations, the effect of jittery oscillations once again induces metastability in latches. On the other hand, for (PW>$PW_{loop}$) oscillations trigger metastability due to both setup and hold timing violations around the clock falling edge.

As the "loop region" has higher switching due to oscillations, the "metastability region" generates entropy with lower energy/bit and is hence generally preferable according to an example embodiment.

Figure 6A:
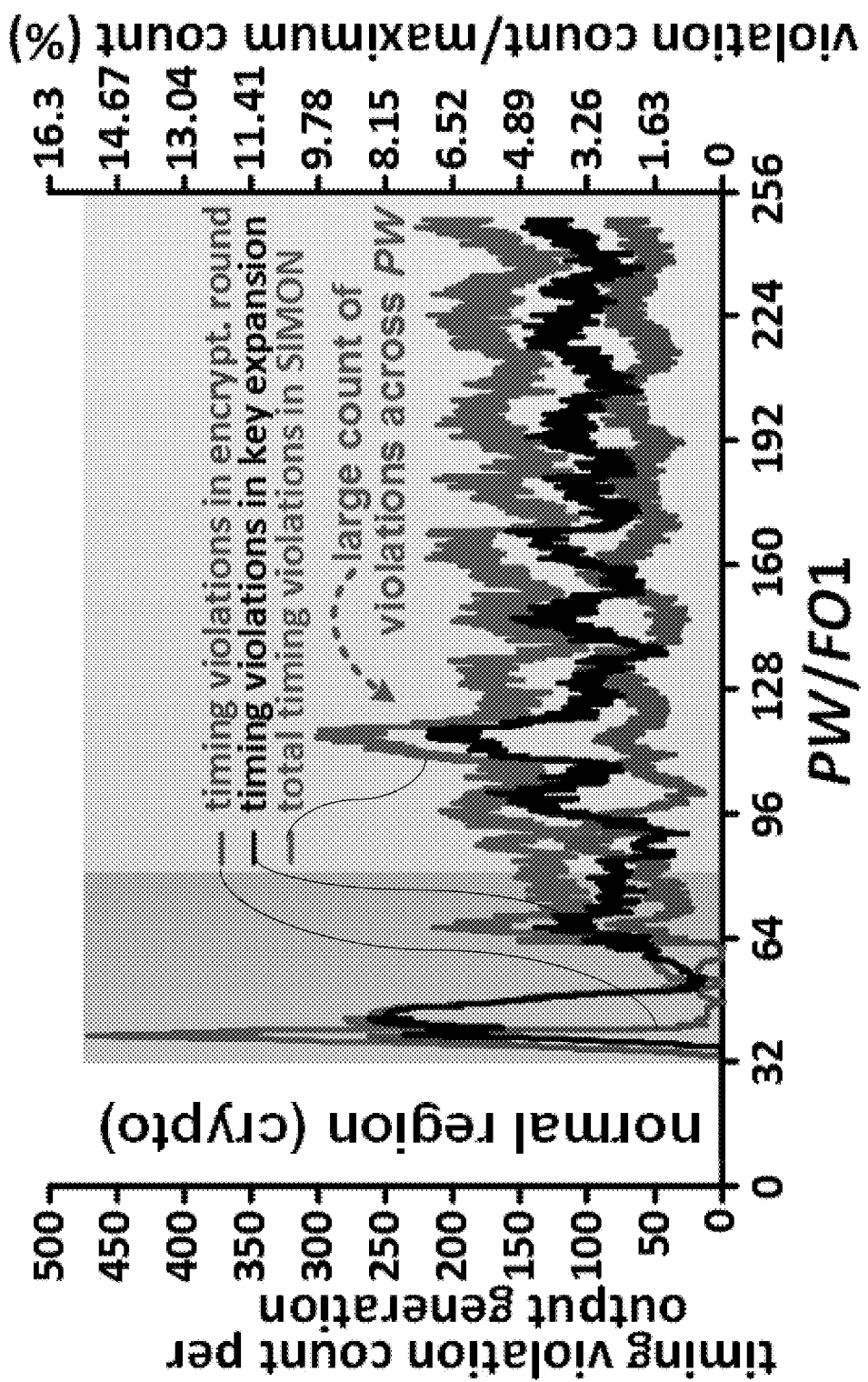
FIG. 6(a) shows timing violation count versus clock PW: fine PW sweep (1-ps) up to 256 F01, according to an example embodiment.
Figure 6B:
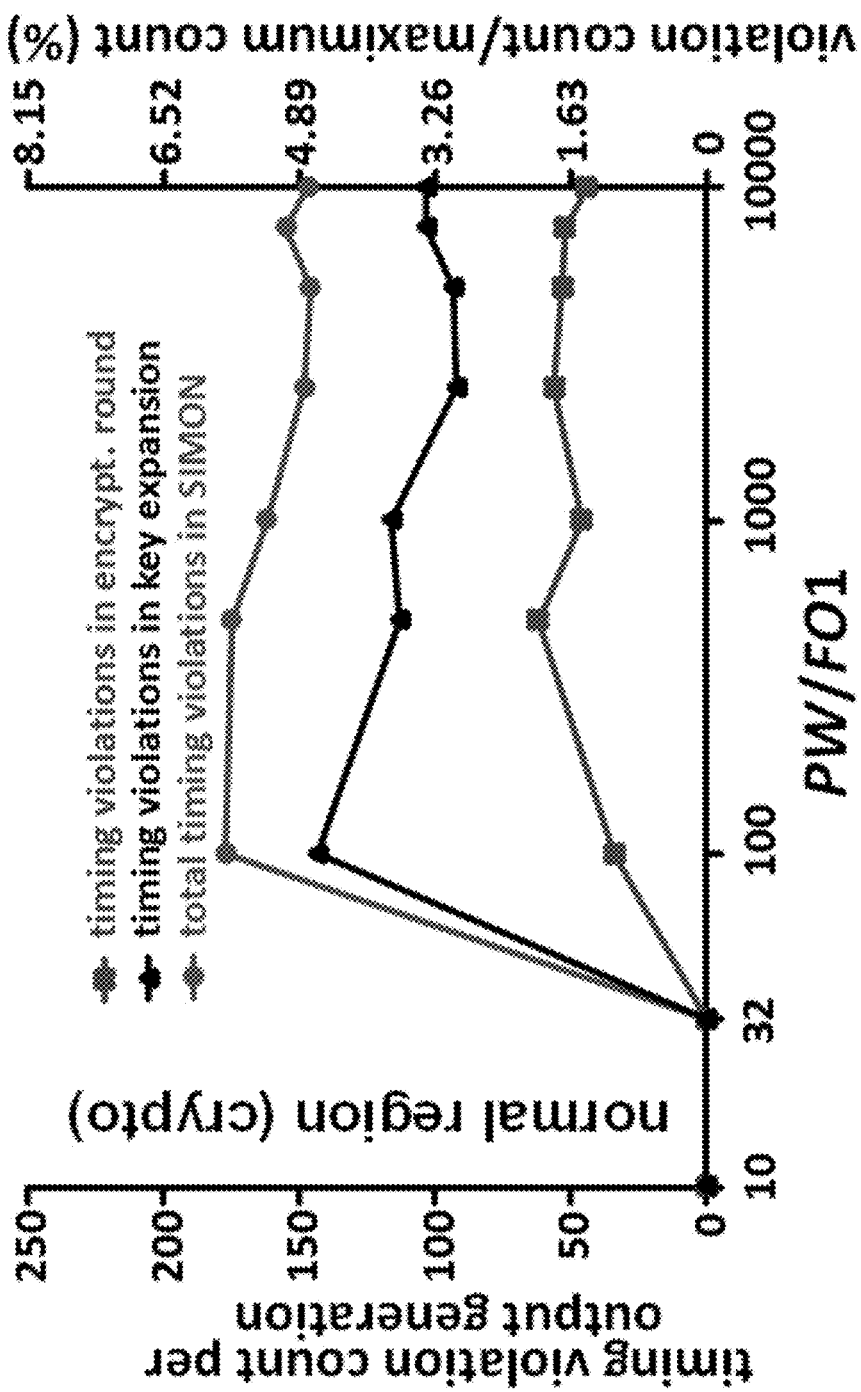
FIG. 6(b) shows timing violation count versus clock PW: coarse PW sweep up to 10,000 F01, according to an example embodiment.

Overall Entropy Generation and Design Considerations According to an Example Embodiment Pre-silicon (i.e., design-time) overall timing violations were quantified through preliminary post-layout logic simulations of the SIMON core performing encryption at nominal conditions (typical, 0.9 V, 25° C.) with 1-fs delay annotation resolution according to an example embodiment, as shown in FIGS. 6(a)-(b). These figures also report the percentage of timing violations experienced by the latches across the 32 rounds per output generation over the total count of latch events (i.e., 96 latches/cycle for a total of 3,072 violations across 32 cycles). It is worth noting that randomness is generated even when a single violation takes place at any latch, thanks to the presence of the XOR tree in the general architecture in FIG. 1(a).

FIG. 6(a) confirms the presence of a continuous range of PW in which the intended timing violations occur (at least up to 10,000 F01 from FIG. 6(b)), and the overlap of hundreds of metastability windows at any specific PW. The average number of timing violation and ratio compared to maximum violation count occurring in each encryption is plotted in FIGS. 6(a)-(b), which expectedly shows a consistent behavior for PW>$PW_{max}$. The timing violation distribution in FIG. 6(a) shows that its count consistently remains in the range of hundreds per output generation. This is more than sufficient to generate randomness, as even a single timing error would immediately propagate through the entire XOR tree in FIG. 1(a), and then it would be exponentially amplified by the confusion and diffusion properties of the combinational logic implementing the cipher. FIGS. 6(a)-(b) also show that key expansion give a contribution to the overall violation count that is approximately doubled compared to the encryption rounds. This can be attributed to the fact that the number of latches and hence potential violations in the key expansion is 64 according to an example embodiment, and hence doubled compared to the latch count employed in encryption rounds (32 latches). The repetitive nature of timing violations for PW>80 F01 is expectable from the self-oscillation behavior in the "loop region".

Figure 7A:
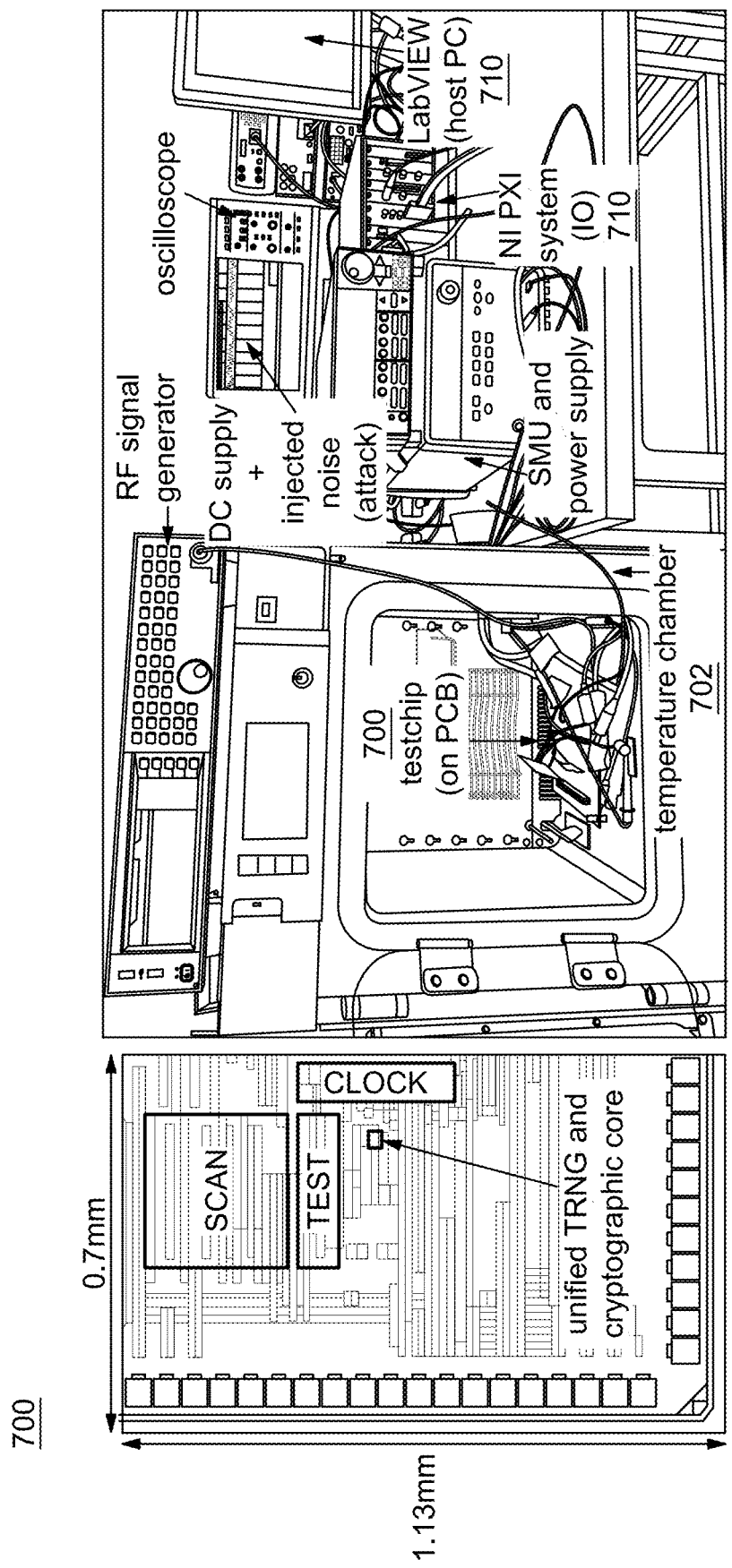
FIG. 7(a) shows a die micrograph and measurement setup, according to an example embodiment.
Figure 7B:
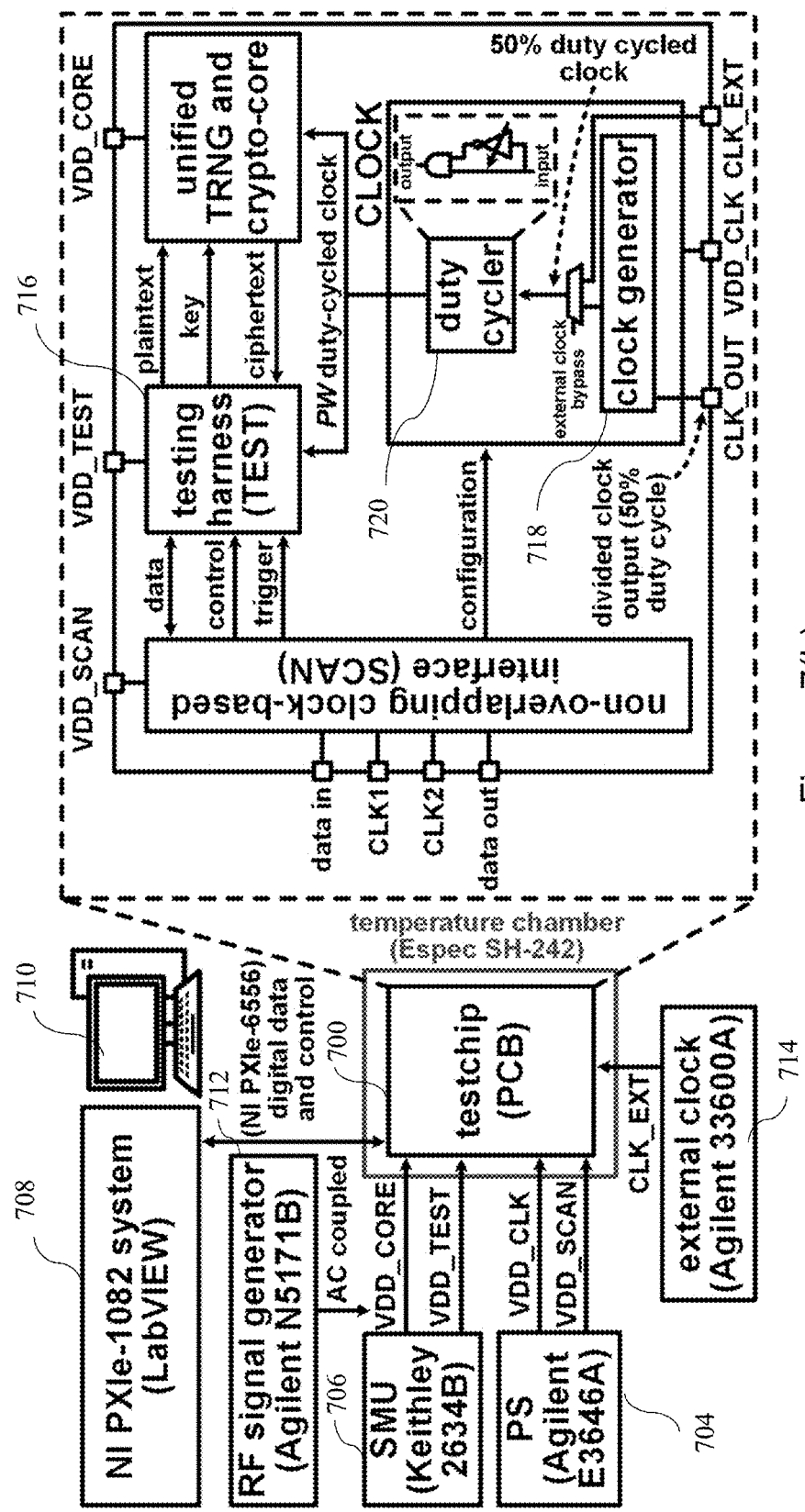
FIG. 7(b) shows a block diagram of the measurement setup and the testchip architecture, according to an example embodiment.

Measurement Results at Nominal Conditions According to an Example Embodiment The unified TRNG and cryptographic core architecture according to an example embodiment was demonstrated with a 40-nm testchip, as shown in FIGS. 7(a)-b). The testchip was fabricated in two different wafer lots with the same foundry and the same process to demonstrate the robustness of approach according to an example embodiment against lot-to-lot variations as well. All measurements for the unified architecture according to an example embodiment were characterized on five dice coming from two different manufacturing lots, with dice #1-3 from the first lot and #4-5 from the second.

Testing Setup and On-Chip Testing Harness According to an Example Embodiment The adopted measurement setup is depicted in FIGS. 7(a)-(b). The testchip 700 was placed inside the Espec SH-242 temperature chamber 702 for temperature sweep from −25° C. to 100° C. The Agilent E3646A 704 was used as power supply for on-chip clocking and testing harness, whereas a Keithley 2634B source measure unit 706 powered the testchip 700 core and measured its consumption. The NI PXI-based host system 708 communicates with the testchip 700 via a digital interface transferring commands and data. The LabVIEW-based interface 710 was used for parameter and operating condition sweeps. The Agilent N5171B signal generator 712 was AC-coupled to the testchip 700 core supply to evaluate the robustness against power supply frequency injection attacks versus frequency. An external clock source Agilent 33600A 714 bypassing the on-chip clock generator 718 was also used for the highest end of the clock pulsewidth range.

The on-chip testing harness 716 in FIG. 7(b) communicates with the testing setup and configures the on-chip blocks via a scan chain driven by a non-overlapping two-phase clock. From a design viewpoint, the registers employed in the unified architecture (see FIG. 2(a)) were implemented in the form of multi-bit (8-bit) static CMOS D-latches. For details of such example implementation of multi-bit (8-bit) static CMOS D-latches, reference is made to [15]. Each 8-bit latch shares the same clock buffer across the internal 1-bit latches to save both area and energy. The on-chip testing harness 716 serves as built-in self-test for at-speed measurements, and was designed using conventional flip-flops for clock pulsewidth-independent operation. The on-chip clock generator 718 with embedded duty cycler 720 utilizes the digitally-programmable delayed and complemented clock to generate a programmable duty cycle with a granularity of 2 F01 and a dynamic range of 256 F01. The Agilent 33600A 714 external clock source was used for wider clock pulsewidth sweeps. The output data was captured by the testing harness 716 and successively scanned out, so that the host system can analyze the output bits to characterize operation of an example embodiment as cryptographic core, and TRNG via statistical NIST tests [13], [14].

The operation of an example embodiment as TRNG or cryptographic core is selected by setting the relevant clock PW (see FIG. 1(c)), and sampling the ciphertext output after 32 clock cycles (i.e., rounds) in both cases. Operation as TRNG uses additional 4-bit XOR entropy extraction as shown in FIG. 3(b), and the output key is stored in a dedicated register as routinely used in cryptographic cores. The resulting energy overhead of key storage is minimal as the same key is generally used for the encryption of several data (i.e., plaintext) blocks [2].

Measurement Results (Nominal Conditions) According to an Example Embodiment

Functionality and robustness against changes in clock PW according to an example embodiment were assessed by sweeping the clock pulsewidth PW from 10 F01 (i.e., well within the "normal region" in FIGS. 3) to 10,000 F01. Supply voltage variations in the ±100 mV range and a temperature in the −25-100° C. range have been considered around the nominal conditions (0.9 V, 25° C.). The resulting Shannon entropy from 32-kb raw output bits in 1,000 repeated encryptions is plotted in FIG. 8 versus PW. For PW<$PW_{max}$=32 F01, deterministic SIMON encryption is performed as required by the unified architecture. As shown in FIG. 9(a), operation at 1.1 V leads to the maximum throughput of 515 Mbps. The core according to an example embodiment is functional down to 0.45 V, at which a minimum energy of 0.25 pJ/bit is achieved from FIG. 9(b) at 25° C. The very same results were measured by sweeping PW from 14 F01 to 24 F01, as expected since no timing violations take place for PW<$PW_{max}$.

Figure 8:
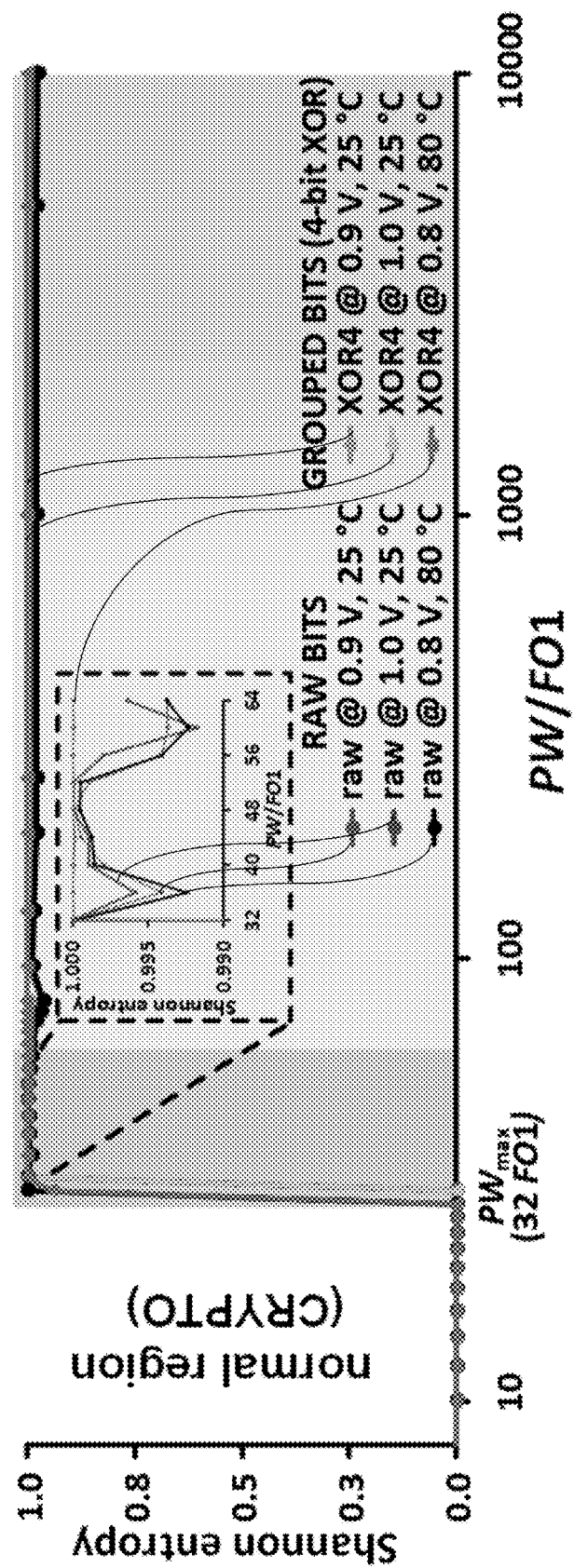
FIG. 8 shows measured Shannon entropy in unified architecture versus clock PW at different operating conditions (with and without 4-bit XOR entropy extractor), according to an example embodiment.
Figure 9B:
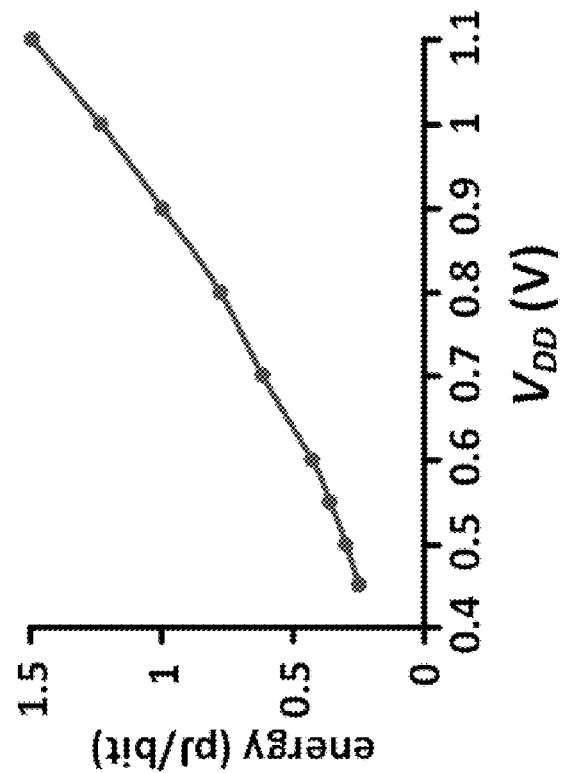
FIG. 9(b) shows measured energy versus supply voltage ($V_{DD}$) for "normal region" (i.e., encryption), according to an example embodiment.
Figure 9A:
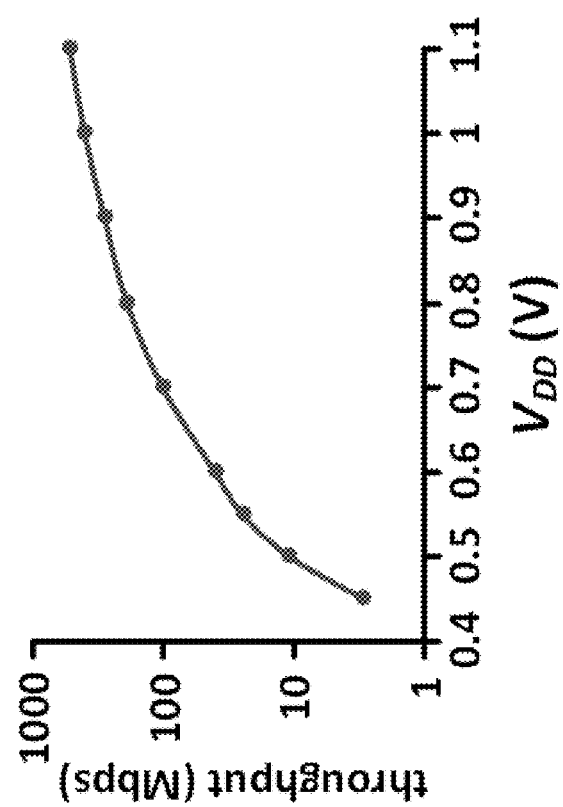
FIG. 9(a) shows measured throughput versus supply voltage ($V_{DD}$) for "normal region" (i.e., encryption), according to an example embodiment.

From FIG. 8, any PW higher than 32 F01 generates a Shannon entropy always greater than 0.989 across all operating conditions, and at any output bit position of the TRNG. The transition from the "normal" to the "metastability" region around $PW_{max}$=32 F01 in FIG. 8 follows very closely the results of static timing analysis in FIG. 4. The high raw output Shannon entropy was expected by considering that the output is obtained as a combination of many concurrent entropy sources (i.e., the latches and their recombination through the XOR tree in FIG. 1(a)). The minor entropy fluctuations across clock pulsewidths cannot be described with a simple analytical model as the output entropy relies on the complex non-linear interaction and combination of redundant entropy sources within cryptographic cipher algorithm, unlike conventional TRNGs relying entirely on a single entropy source.

The raw output Shannon entropy at different bit positions is shown in FIGS. 10(a)-(b) at a moderate PW of 64 F01 as representative of the "metastability region" in FIG. 1(c), and a relatively high PW of 256 F01 as representative of the "loop region", across five dice at nominal conditions. From these figures, some output positions have better entropy than others, and the same applies to different dice. Although there are always bit positions with Shannon entropy above the 0.99997 threshold required by the NIST tests [13], [14]. Also, FIGS. 10(c)-(d) show the raw output Shannon entropy across bit positions, highlighting the effect of process variations from local to lot-to-lot according to example embodiment. The related results were measured under worst-case operating conditions (0.8 V, −25° C.) with extreme input plaintext and key bias, ±100-mV supply voltage variations, and lowest temperature in the considered range. FIGS. 10(a)-(d) confirm that there is no observable correlation between raw entropies at different bit positions across dice, manufacturing lots, clock pulsewidth, input statistics and environmental conditions, according to example embodiments. High output Shannon entropy across dice and operating conditions is enforced by adding an entropy extractor, as exemplified by the additional 4-bit XOR-based entropy extraction in FIG. 3(b) according to an example embodiment. At a 4.6% overhead of 24 XOR gates to combine 32 bits into 8 bits, it effectively eliminates the residual 0/1 bias of the raw bits and preferably assures cryptographic-grade quality across all bit positions. The resulting entropy at the XOR output in FIG. 8 is well above the NIST tests requirement and hence qualified for cryptographic applications, in every position, for all dice and under all environmental conditions and adopted PW. Measurements also confirm that the raw output across dice and operating conditions has no temporal or spatial correlation. Indeed, the phi-correlation coefficient test [16] results to a mutual correlation coefficient distribution with a nearly-zero mean of μ=0.004 and standard deviation σ=0.003.

Figure 11:
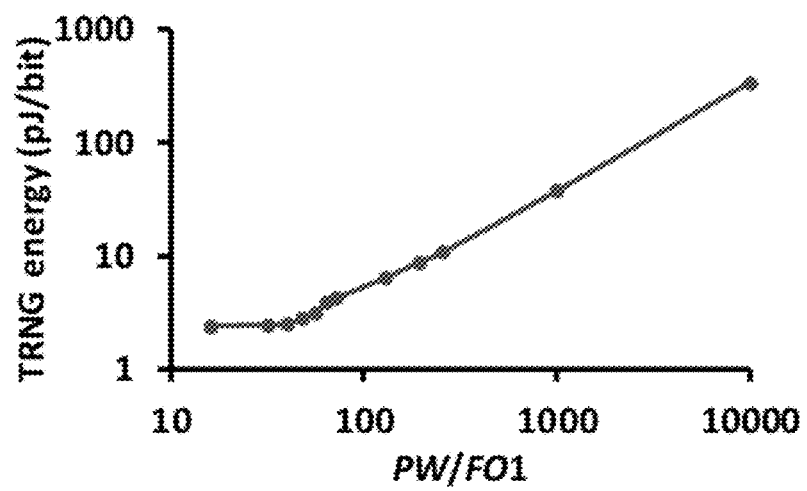
FIG. 11 shows measured TRNG (with 4-bit XOR) minimum energy versus clock PW, according to an example embodiment.

The impact of the clock pulsewidth PW on the measured TRNG energy consumption at 0.7 V and 25° C. according to an example embodiment is quantified in FIG. 11 for PW ranging from 32 F01 to 10,000 F01. From this figure, the lowest TRNG energy is achieved in the "metastability region" and is 2.5 pJ/bit at PW=40 F01. An increase in PW leads to a moderate energy increase in the same region and becomes 4 pJ/bit at PW=64 F01, which is in the region where the number of hold violations are more frequent (see histogram in FIG. 4). When PW is increased to the level of the "loop region" in FIG. 1(c), the energy increase is more pronounced and becomes linear with a rate of 35 fJ/bit increase per F01 from FIG. 11. Such energy increase in the "loop region" is due to the linear increase in the switching activity under wider PW, as this allows a larger number of oscillations per cycle as occurs in conventional ring oscillator-based TRNGs. Overall, the "metastability region" provides nearly the same entropy while keeping energy lower energy compared to "loop region". Accordingly, the TRNG robustness across operating conditions and attacks according to an example embodiment is quantified for clock pulsewidths of up to 256 F01 in the following.

The quality of the TRNG output bitstream according to an example embodiment was first quantified at nominal conditions (0.9 V, 25° C.) and clock pulsewidth PW=64 F01. The output quality was characterized with the NIST 800-22 [13] and the NIST 800-90B [14] test suites on 1-Mb datasets generated after 4-bit off-chip XOR post-processing.

Figure 12:
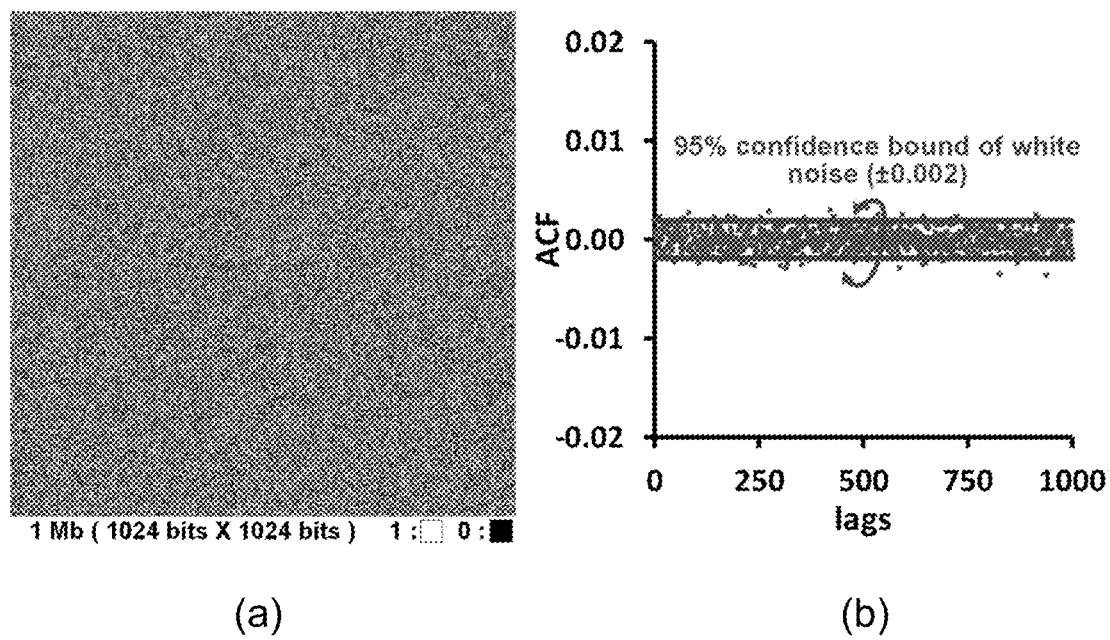
FIG. 12(a) shows measured speckle diagram, according to an example embodiment.
FIG. 12(b) shows measured autocorrelation function (ACF), according to an example embodiment.

Randomness evaluation was performed on output bitstreams collected at nominal conditions 0.9 V and 25° C., and PW equal to 64 F01 (256 F01) as representative of the "metastability" ("loop") region in FIG. 1(c). FIG. 12(a) shows the speckle diagram of a 1-Mb bit sequence, which visually suggests that there is no obvious pattern. More quantitatively, FIG. 12(b) plots the autocorrelation function (ACF) over 1,000 lags, and shows that 96% of ACF data points fall within the Gaussian white noise distribution (μ=0, $\sigma^2$=0.002), confirming the absence of any temporal correlations. The output bitstreams pass all NIST 800-22 and NIST 800-90B tests, as respectively detailed in Tables I and II for individual tests at nominal conditions. The output min-entropy [14] is found to be always greater than 0.991.

TABLE I

NIST 800-22 TEST RESULTS

| Test | p-value | Pass? |
|---|---|---|
| Frequency | 0.703 | Yes |
| Block Frequency | 0.414 | Yes |
| Runs | 0.379 | Yes |
| Longest Runs | 0.965 | Yes |
| Rank | 0.603 | Yes |
| FFT | 0.402 | Yes |
| Non-Overlapping Template | 0.999 | Yes |
| Overlapping Template | 0.293 | Yes |
| Universal | 0.999 | Yes |
| Linear Complexity | 0.793 | Yes |
| Serial | 0.907 | Yes |
| Approximate Entropy | 0.907 | Yes |
| Cumulative Sums | 0.176 | Yes |
| Random Excursions | 0.053 | Yes |
| Random Excursions Variant | 0.170 | Yes |

TABLE II

NIST 800-90B TEST RESULTS

| Test | Result (score, degree of freedom) |
|---|---|
| IID Permutation | PASS (N/A, N/A) |
| Chi-square Independence | PASS (2,045, 2,046) |
| Chi-square Goodness of fit | PASS (13.94, 9) |
| LRS Test | PASS (N/A, N/A) |

Robustness of the TRNG Performance Against Clock Generation Non-Idealities According to an Example Embodiment The TRNG performance according to an example embodiment was confirmed to be robust against clock generation non-idealities, such as clock period inaccuracy, clock period jitter, clock pulsewidth inaccuracy and clock pulsewidth jitter, as discussed below.

Hold violation-induced metastability (self-oscillating) behavior is enabled by pulsewidths wider than $PW_{max}$ ($PW_{loop}$) according to an example embodiment, regardless of the clock frequency and exact time of clock edge occurrence, as quantified by the timing violation conditions in FIGS. 2(a) and (b).

Figure 13:
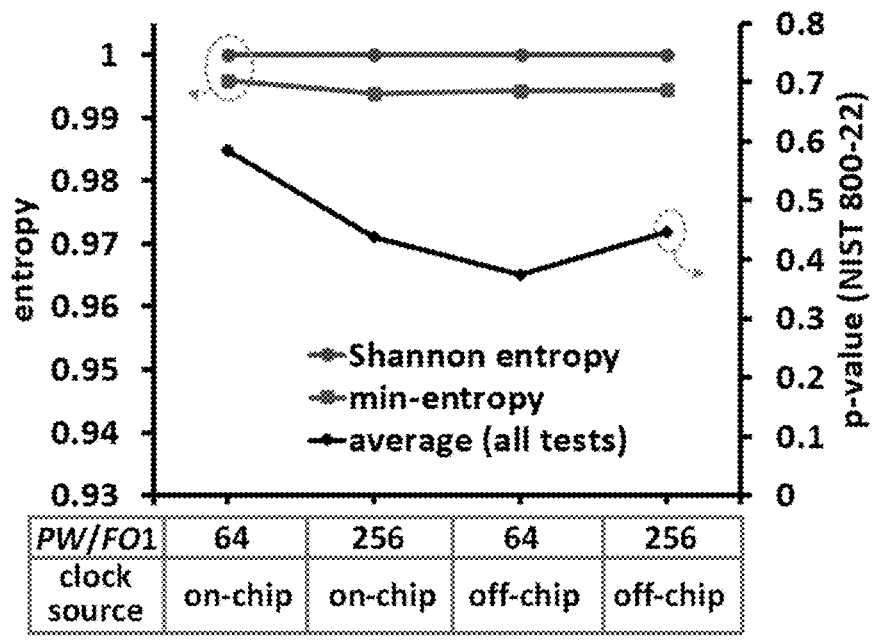
FIG. 13 shows measured output entropy versus clock PW using different clock sources, according to an example embodiment.

Regarding the effect of clock period jitter, the output entropy generation was also tested with the Agilent 33600A 714 off-chip clock source in FIG. 7(b), in addition to the on-chip ring oscillator adopted in the rest of the characterization of an example embodiment. The off-chip source generates a 1-MHz clock (frequency limited by the testchip interface) with 50% duty cycle driving the on-chip duty cycler to adjust the clock pulsewidth as necessary. The same clock frequency was also generated by the adjustable on-chip clock generator to isolate the effect of jitter. This frequency differs from the rest of the characterization by up to 280× at the maximum throughput. The external clock source has an RMS period jitter of 1 ps, whereas the on-chip ring oscillator for clock generation is expected to be in the tens of ps range (it cannot be measured with dedicated testing equipment, due to the limited bandwidth of I/Os). FIG. 13 confirms the consistency of the output entropy and the ability to pass all NIST tests according to an example embodiment, regardless of the specific clock source adopted, as measured at nominal conditions (0.9 V, 25° C.). The independence of the output entropy and ability of NIST tests passing according to an example embodiment is explained by considering that the entropy generation phenomena are independent of the clock period jitter.

Regarding the impact of the clock pulsewidth generation, its accuracy target is rather relaxed and is in the order of ~10 F01 in "normal region", as it simply needs to be kept a fraction of the available window of suitable values of PW (i.e., 32 F01). The accuracy requirement of PW is even more relaxed in the "metastability" and "loop" region according to an example embodiment, as entropy is highly consistent for $PW>PW_{max}$ ($PW>PW_{loop}$). Indeed, the induction of metastability (self-oscillation) is guaranteed regardless of the specific value of PW according to an example embodiment. Further details on the solid consistency of the output entropy across clock pulsewidths are provided below.

Figure 14:
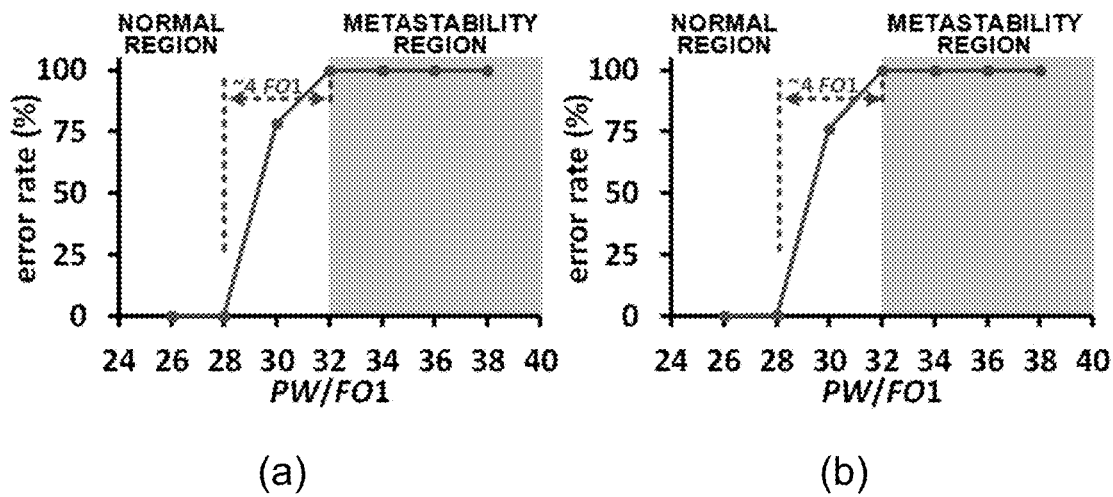
FIG. 14(a) shows measured output error rate across 100,000 repeated iterations to capture the impact of clock pulsewidth jitter at nominal conditions (0.9 V, 25° C.) across clock pulsewidths PW around the boundary between the "normal" and the "metastability" region with on-chip clock source (1 MHz), according to an example embodiment.
FIG. 14(b) shows measured output error rate across 100,000 repeated iterations to capture the impact of clock pulsewidth jitter at nominal conditions (0.9 V, 25° C.) across clock pulsewidths PW around the boundary between the "normal" and the "metastability" region with off-chip clock source (1 MHz), according to an example embodiment.

FIGS. 14(a)-(b) respectively show the measured output error rate with the on-chip and the off-chip clock source at nominal conditions (0.9 V, 25° C.), as evaluated across 100,000 runs (i.e., repeated iterations). Both figures show a decisive increase of the error rate from 0% ("normal region") to 100% ("metastability region") in ~4 F01 delays around the critical pulsewidth $PW_{max}$=32 F01. The error rate is defined as ratio of output words with at least one incorrect bit (compared to the golden output measured for clock PW corresponding to the "normal region") and the total generated word count. From a clock generation viewpoint, the change of error rate depends solely on the pulsewidth jitter. From FIG. 14(a), the error rate at 28 F01 drops to near-zero and is 0.27% (0.65%) for the on-chip (off-chip) clock generator, including the duty cycler. Under the usual assumption of Gaussian clock pulsewidth jitter, such error rate indicates that the jitter at 2.8 (2.5) standard deviations for the on-chip (off-chip) source is equal to 4 F01. Hence, the clock pulsewidth RMS jitter experienced by the TRNG according to an example embodiment is minimal (1.4-1.6 F01) and uninfluential, whenever PW is kept above (below) 32 F01 by a few F01 under the "metastability" ("normal") region. On a side note, the similar clock pulsewidth jitter of the two very different clock sources indicates that they are both dominated by the jitter introduced by the common duty cycler, which lies in the clock path in either case.

In summary, the TRNG output entropy according to an example embodiment was shown to be robust against clocking non-idealities (i.e., clock period, clock period jitter, clock pulsewidth and clock pulsewidth jitter were shown to be rather relaxed). This advantageously avoids the need for any modification, calibration or additional testing time for the clock generation.

TRNG Robustness across Operating Conditions According to an Example Embodiment, and Comparison with Prior Art

TRNG Robustness Against Variations According to an Example Embodiment

Figure 15:
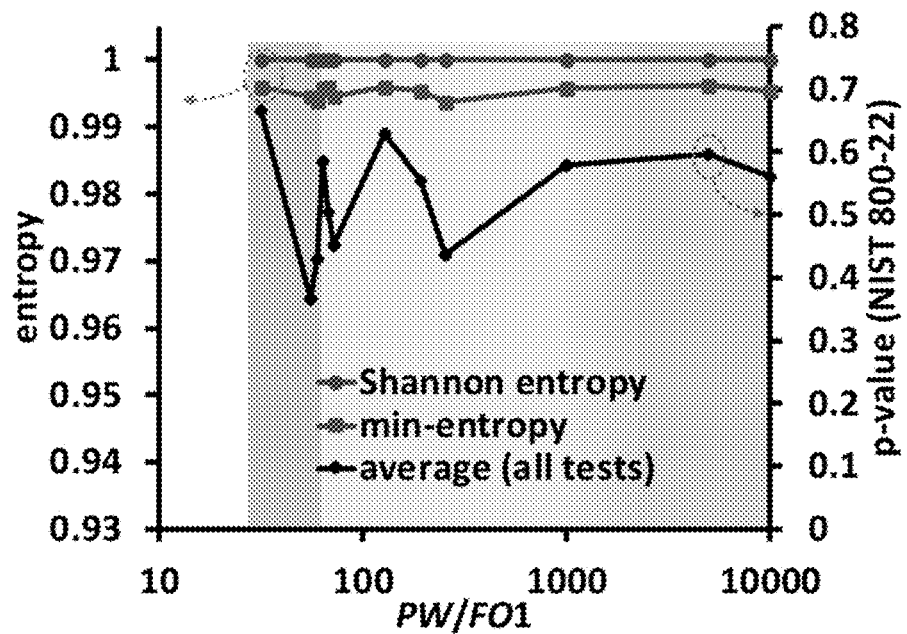
FIG. 15 shows measured output entropy versus clock PW, according to an example embodiment.

The robustness of the TRNG output quality according to an example embodiment versus the clock pulsewidth PW is characterized in FIG. 15 at nominal conditions across dice from different lots. This figure shows that the Shannon entropy and the p-value from NIST 800-22, as well as the min-entropy from the NIST 800-90B test suite are above the threshold requirements, confirming cryptographic-grade output quality according to an example embodiment. In particular, the TRNG output pass all NIST tests with min-entropy greater than 0.994 (i.e., greater than the passing threshold 0.991), confirming that the architecture according to an example embodiment is resilient across die-to-die and lot-to-lot process variations. Such results are advantageously achieved with no need for calibration, thanks to the inherent availability of redundant entropy sources according to an example embodiment, as described above.

Robustness of TRNG output entropy against operating conditions variations was performed on output bitstreams collected at PW equal to 64 F01 (256 F01) as representative of the "metastability" ("loop") region in FIGS. 16-19 with adequate margin in the transition from "normal region" of "metastability region" around $PW_{max}$=32 F01 (see FIG. 1(c) and FIG. 8).

Figure 16:
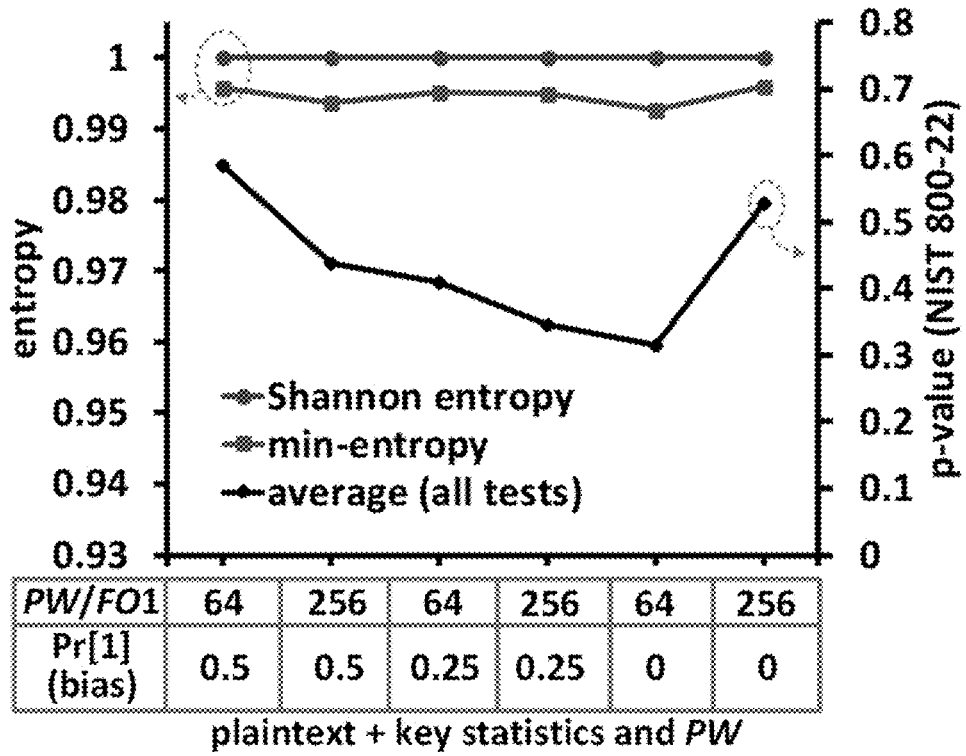
FIG. 16 shows measured output entropy versus different initialization input data statistics (plaintext and key) at two different PW, according to an example embodiment.

The robustness of the output according to an example embodiment against the initialization input (i.e., plaintext and key) value and its bias is quantified in FIG. 16. In this figure, the TRNG according to an example embodiment is shown to pass all NIST tests under drastically different input statistics (i.e., probability of 1's) from random (e.g., 50%) to completely biased (e.g., 0% or reset). The insignificant change in the output entropy and the p-values much larger than the NIST 800-22 test threshold of 0.01 confirm that the output quality of the unified architecture according to an example embodiment is fundamentally independent of the input statistics.

Figure 17:
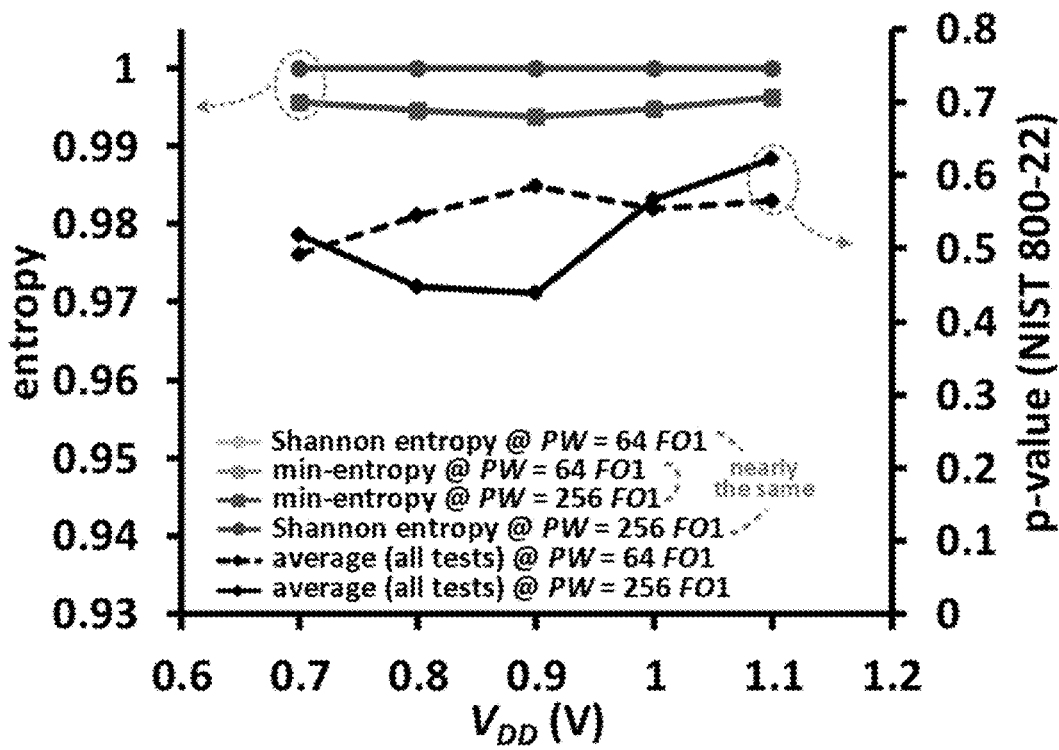
FIG. 17 shows measured output entropy versus supply voltage ($V_{DD}$) under different PW, according to an example embodiment.
Figure 18:
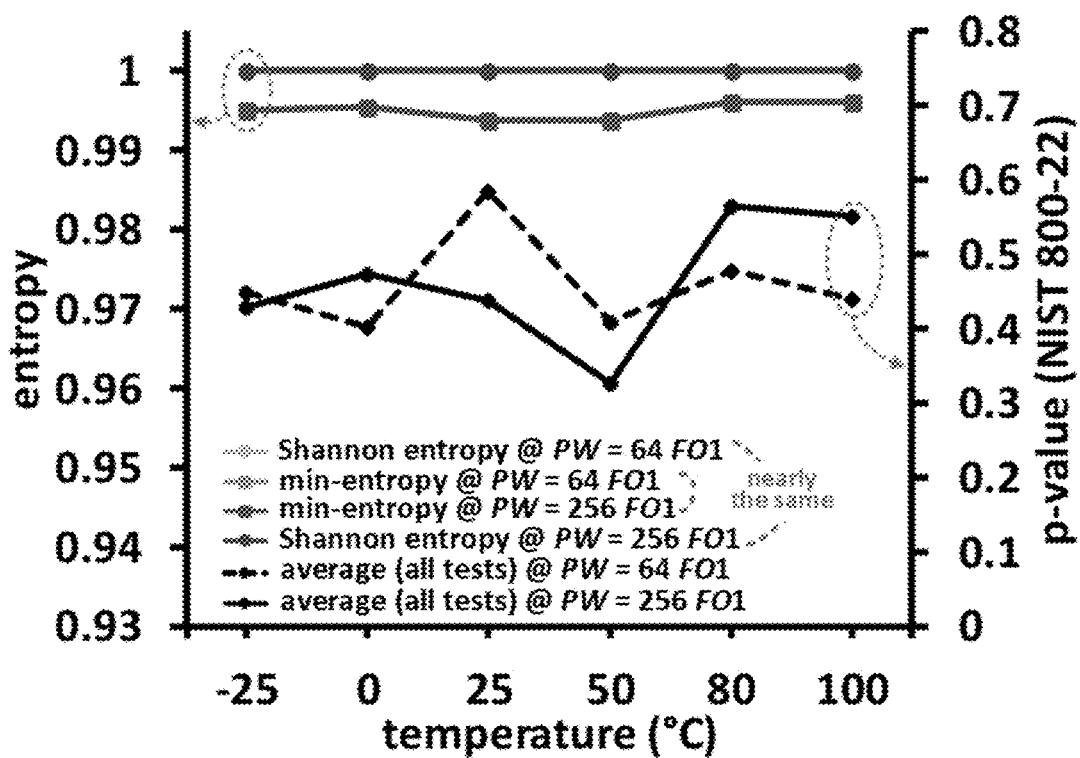
FIG. 18 shows measured output entropy versus temperature under different PW, according to an example embodiment.

Robustness against supply voltage variations is quantified in FIG. 17, where the entropy according to an example embodiment is again confirmed to be well above the NIST test suite requirement, both in the "metastability" and the "loop" region. Indeed, the output bitstreams pass all NIST tests even under very substantial supply voltage variations of ±200 mV (i.e., 22%) around nominal supply voltage. Supply voltages below the minimum operating voltage of 0.7 V lead to further entropy degradation and hence require additional post-processing to pass all the NIST tests. In view of the extra energy cost of additional post-processing and system design effort, voltages below 0.7 V are not preferred and therefore not considered in the following. The same conclusions hold when the temperature varies in the −25-100° C. range, as shown in FIG. 18. Such high level of robustness against voltage and temperature variations can be attributed to the inherent delay compensation in data path delay and clock PW according to an example embodiment, which maintains the relative data and clock timing nearly unaffected under variations.

Figure 19A:
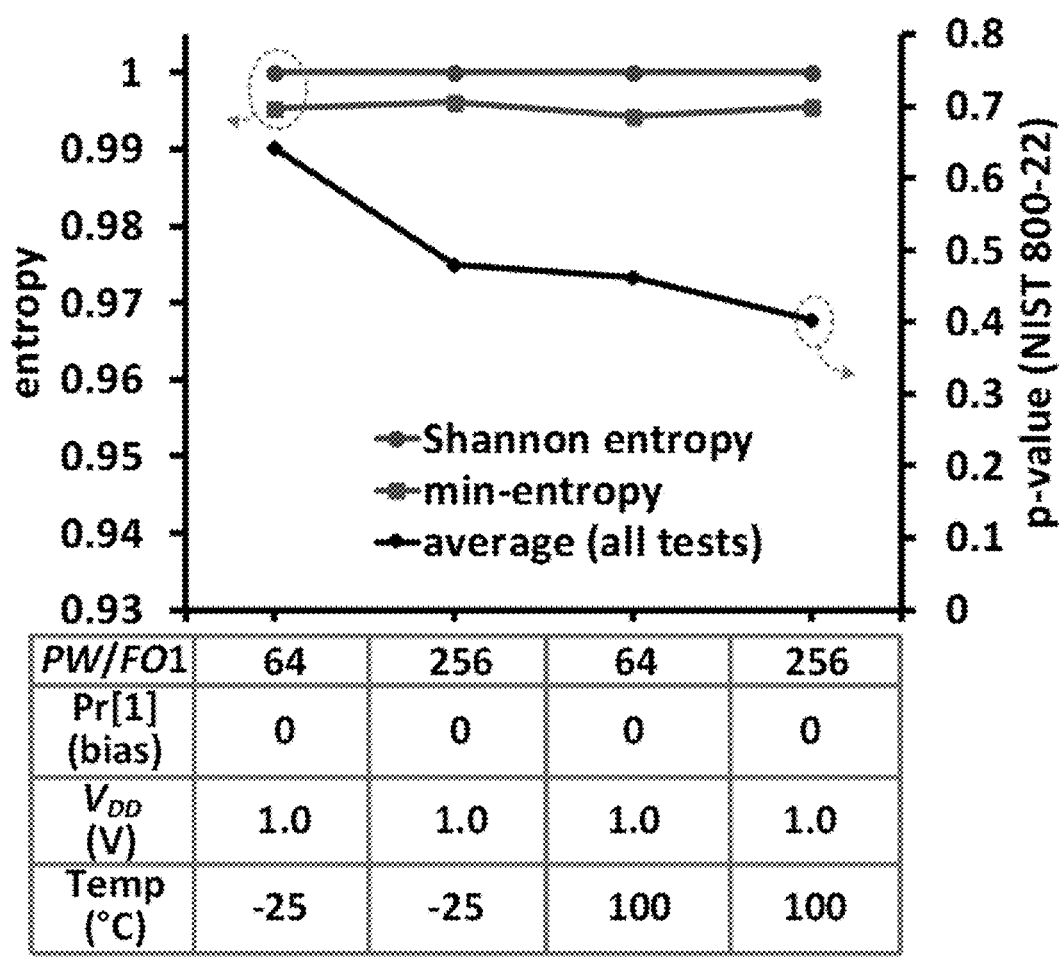
FIG. 19(a) shows measured output entropy under joint worst-case clock pulsewidth, temperature and input statistics under 100-mV fluctuations around the 0.9-V nominal voltage: +100 mV, according to an example embodiment.
Figure 19B:
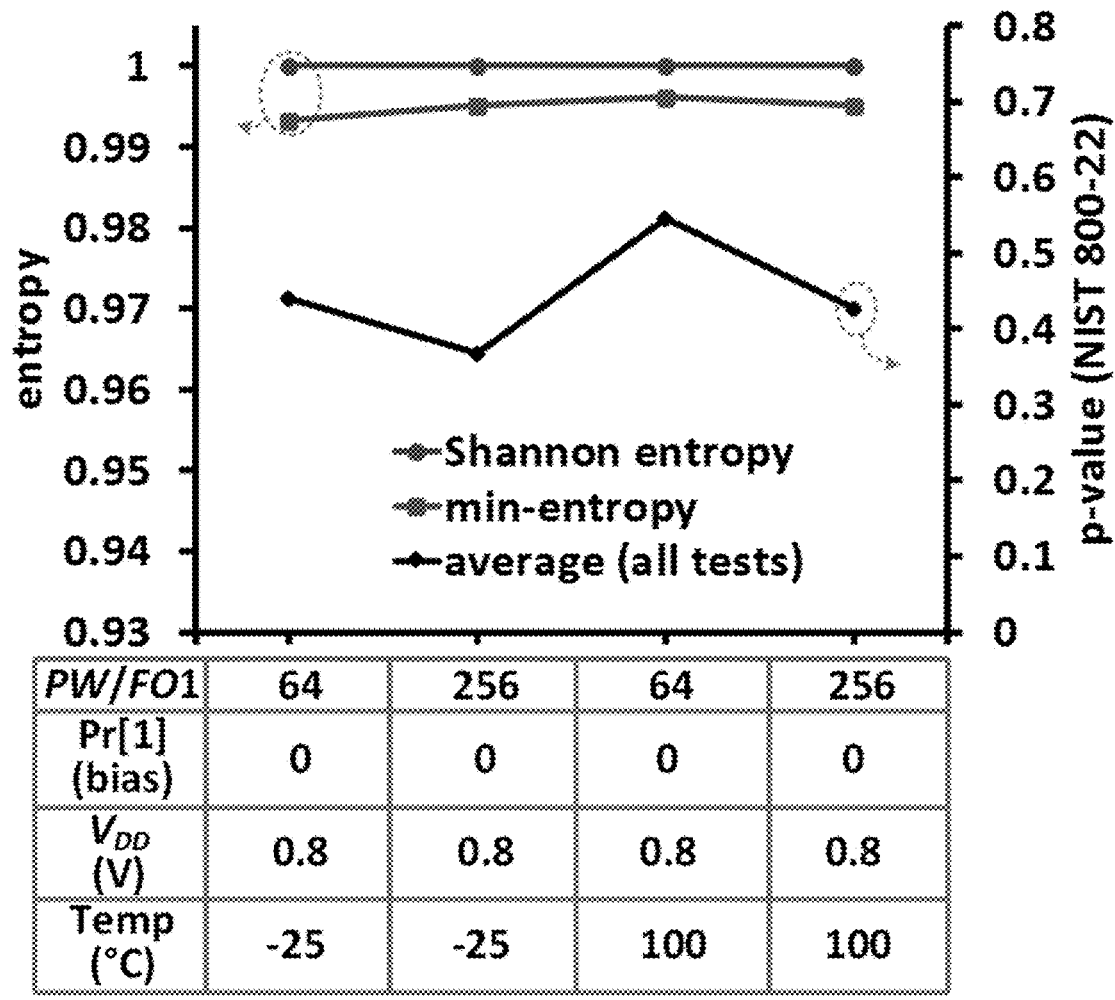
FIG. 19(b) shows measured output entropy under joint worst-case clock pulsewidth, temperature and input statistics under 100-mV fluctuations around the 0.9-V nominal voltage: −100 mV, according to an example embodiment.

To gain a deeper insight into the robustness according to an example embodiment under simultaneous sources of variations, the entropy is plotted in FIGS. 19(a)-(b) for several worst-case combinations of input clock pulsewidth, input statistics, supply voltage and temperature. FIG. 19(a) shows worst-case condition in the "metastability region" to occur at higher supply voltages, low temperature, and completely biased input statistics, as these conditions simultaneously reduce the metastability resolution time in latches and hence the randomness source. The same considerations hold for the "loop region" as the above conditions reduce the cycle-to-cycle and the accumulated jitter. FIG. 19(b) shows the worst-case conditions at 0.8-V supply (i.e., 100 mV below the nominal voltage of 0.9 V) and extreme temperatures for both the "metastability" (PW=64 FO1) and the "loop" (PW=256 FO1) region. Under such pessimistic scenarios, from FIGS. 19(a)-(b) the TRNG output according to an example embodiment pass all NIST tests with min-entropy greater than 0.993 as desired.

TRNG Robustness Against Power Supply Frequency Injection Attack According to an Example Embodiment Ring oscillator-based TRNGs are known to be potentially susceptible to the frequency injection attacks through power supply. Since the architecture according to an example embodiment includes self-oscillations as a mechanism to generate entropy (at least when large PW is adopted), its robustness against these attacks is assessed in the following.

Figure 20:
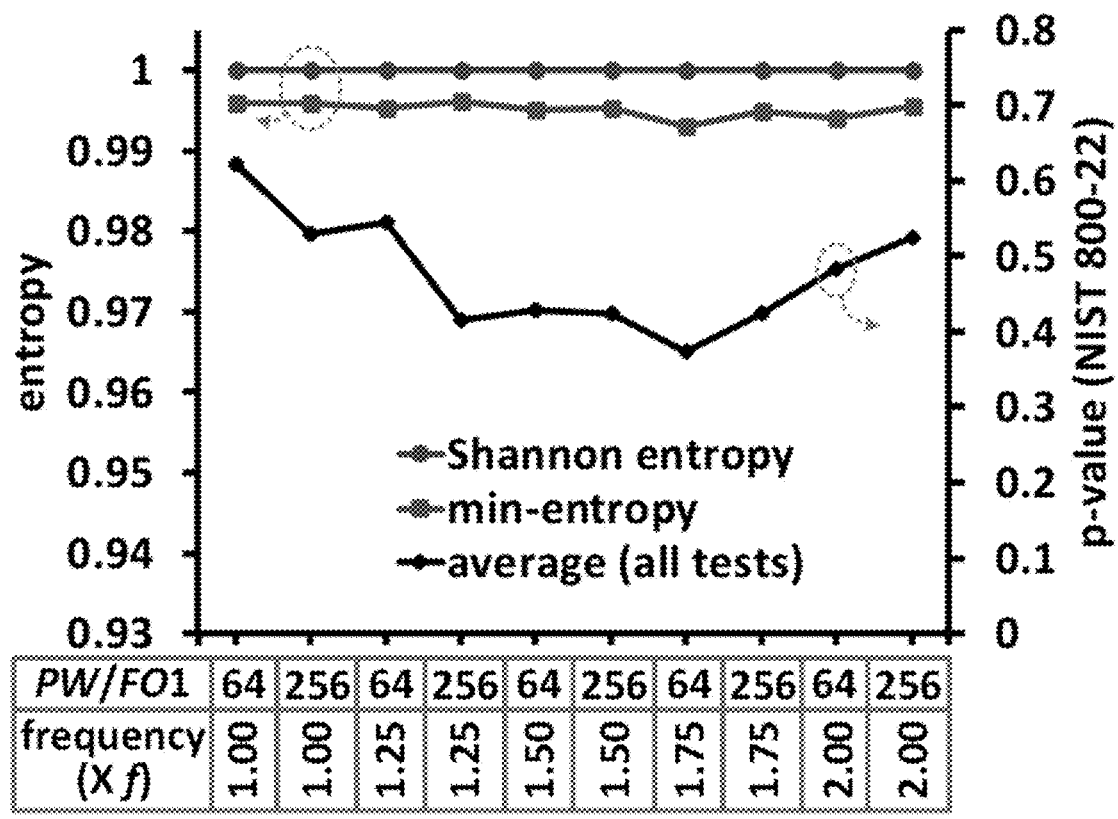
FIG. 20 shows measured output entropy under frequency injection attack, according to an example embodiment.

In such attacks, an external frequency at an integer multiple of the oscillation frequency can lock the internal frequency to a known frequency, masking the randomness source and hence producing a predictable TRNG output. In the testing setup in FIGS. 7(a)-(b), a RF signal generator 712 injects the attack signal into the TRNG power supply through a high-pass filter, which is summed to the DC source providing the supply voltage. As shown in FIG. 20, the measured Shannon and min-entropy remain above the NIST test thresholds even when a strong signal amplitude of 0.3 $V_{p-p}$ is applied, where the amplitude is limited by the testing setup. In this figure, the injected frequency is swept up to twice the average oscillation frequency among the logic paths in FIG. 5 (i.e., 500 MHz, as dictated by twice the average max-delay of 80 FO1 in this figure). The TRNG output according to an example embodiment passes all NIST tests under all worst-case conditions and the above attack signal, confirming its high resilience against frequency injection attacks as summarized in FIG. 20.

The robustness against frequency injection attacks can be attributed to the randomness mechanisms according to an example embodiment which are 1) frequency-independent in the "metastability region", since hold violations do not involve oscillations, and 2) the self-oscillations involve a very large number of loops with several different frequencies, which eliminates the single oscillation frequency target that such attacks leverage on, when applied to conventional ring oscillators. Robustness against such attacks is strengthened by the fact that supply variations affect the datapath and the clock timing nearly equally according to an example embodiment, preserving their relative timing and leaving the TRNG according to an example embodiment unaffected (see considerations on FIG. 17).

Comparison with Prior Art

FIG. 21 (Table III) compares the unified architecture according to an example embodiment with existing TRNGs. The architecture according to an example embodiment can uniquely combine multiple randomness sources depending on the chosen PW, and does not require any calibration. Minimal design effort is required compared to existing TRNGs, as the architecture according to an example embodiment is designed with automated standard cell flows, as opposed to existing TRNGs. This allows unique inherent obfuscation and higher resilience against physical attacks, as the TRNG according to an example embodiment is fully immersed in logic and does not need to send keys to the cryptographic core through an intermediate bus.

The normalized area of $0.43 \cdot 10^6$ $F^2$ (F=minimum feature size of the process) according to an example embodiment is the lowest among all-digital dedicated (i.e., standalone) TRNGs [7], [11], offering a 1.2-12.9× reduction over them. The area according to an example embodiment is the second lowest among all of the considered existing TRNGs, and this advantage is expected to persist or increase at finer technology generations according to example embodiments, in view of the unique standard cell-based nature according to an example embodiment. The architecture according to an example embodiment also improves the area efficiency (i.e., throughput/area) by 6.6-78× over existing dedicated TRNGs, in view of its compact area and competitive throughput. The area efficiency and low normalized area stems from the adopted unified approach according to an example embodiment that consolidates the entire signal chain from TRNG to cryptographic core into the same area.

The minimum energy is equivalent to [3], [4], lower than the existing TRNGs [6], [7], [11], [17] by 1.2-14.2×, except that is higher than [5] by 8.3×, although the latter has nearly three (four) orders of magnitude lower throughput (area efficiency). Finally, compared to ring oscillator-based TRNGs, the proposed architecture is inherently robust against frequency injection attacks, without requiring extra circuitry such as run-time calibration to adjust the oscillation frequency, or low-pass filtered supply.

Figure 22:
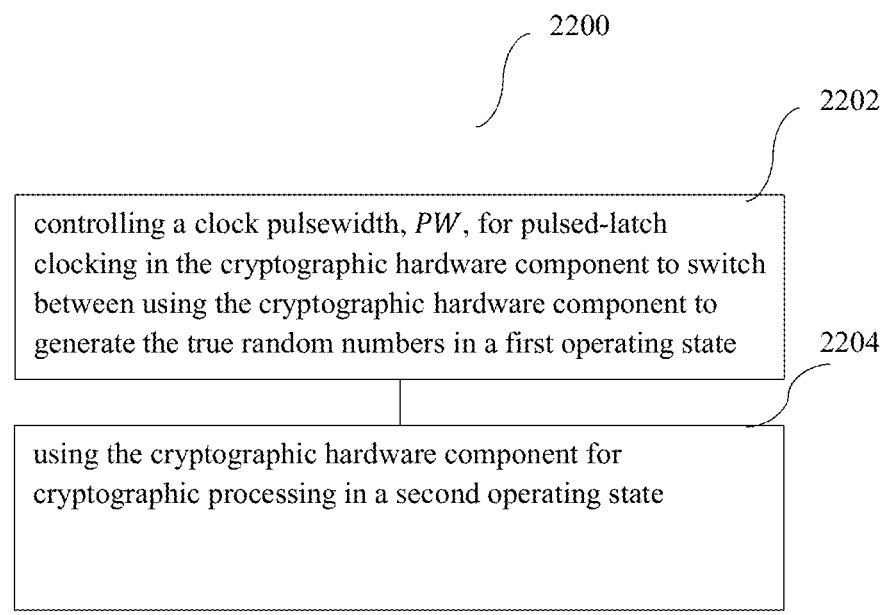
FIG. 22 shows a flowchart illustrating a method of generating true random numbers for use by a cryptographic hardware component for cryptographic algorithms or communication protocols, according to an example embodiment.

FIG. 22 shows a flowchart 2200 illustrating a method of generating true random numbers for use by a cryptographic hardware component for cryptographic algorithms or communication protocols, according to an example embodiment. At step 2202, a clock pulsewidth, PW, for pulsed-latch clocking in the cryptographic hardware component is controlled to switch between using the cryptographic hardware component to generate the true random numbers in a first operating state. At step 2204, the cryptographic hardware component is used for cryptographic processing in a second operating state.

Using the cryptographic hardware component to generate the true random numbers in the first operating state may comprise exploiting hold-margin in pulsed latch pipelines of the cryptographic hardware component via clock pulsewidth overstretching.

Controlling the PW may comprise controlling the PW to be smaller than a hold violation window in the cryptographic hardware component during the second operating state.

Controlling the PW may comprise controlling the PW to be larger than the hold violation window in the cryptographic hardware component during the first operating state. Controlling the PW may comprise controlling the PW to be larger than the hold violation window and larger than a minimum loop delay in the cryptographic hardware component during the first operating state. Controlling the PW may comprise controlling the PW to be larger than a threshold multiple of the minimum loop delay in the cryptographic hardware component during the first operating state.

The threshold multiple may comprise a nominal clock pulsewidth plus a hold margin to increase the combinational min-delay.

PW may be controlled to be any value greater than 32 F01, wherein F01 is an inverter delay with a fan-out of one for a given design technology. PW may be controlled to be 64 F01. PW may be controlled to be 256 F01.

A cryptographic hardware component for cryptographic algorithms or communication protocols, according to an example embodiment is configured for controlling a clock pulsewidth, PW, for pulsed-latch clocking in the cryptographic hardware component to switch between using the cryptographic hardware component to generate true random numbers in a first operating state, and using the cryptographic hardware component for cryptographic processing in a second operating state.

The cryptographic hardware component may be configured for generating the true random numbers in the first operating state by exploiting hold-margin in pulsed latch pipelines of the cryptographic hardware component via clock pulsewidth overstretching.

The cryptographic hardware component may be configured for controlling the PW to be smaller than a hold violation window in the cryptographic hardware component during the second operating state.

The cryptographic hardware component may be configured for controlling the PW to be larger than the hold violation window in the cryptographic hardware component during the first operating state. The cryptographic hardware component may be configured for controlling the PW to be larger than the hold violation window and larger than the minimum loop delay in the cryptographic hardware component during the first operating state. The cryptographic hardware component may be configured for controlling the PW to be larger than the threshold multiple of the minimum loop delay in the cryptographic hardware component during the first operating state.

The threshold multiple may comprise a nominal clock pulsewidth plus a hold margin to increase the combinational min-delay.

PW may be controlled to be any value greater than 32 F01, wherein F01 is an inverter delay with a fan-out of one for a given design technology. PW may be controlled to be 64 F01. PW may be controlled to be 256 F01.

As described above, a unified architecture for TRNG and cryptographic core according to an example embodiment has been provided for constrained and secure integrated systems. Randomness generation according to an example embodiment is achieved by inducing metastability and/or logic self-oscillations via clock pulsewidth PW over-stretching under pulsed latch clocking. In an example embodiment, the very same cryptographic core performs in-situ entropy extraction via Shannon confusion and diffusion, and then utilizes it for encryption by bringing the clock pulse back to the range meeting the correct clock pulsewidth timing constraints.

Cryptographic-grade entropy and 100% NIST tests pass have been demonstrated under lot-to-lot, die-to-die, voltage and temperature variations, as well as clock pulsewidth uncertainty, extreme bias of the initialization input adopted, and frequency injection attacks, according to an example embodiment. In view of its superior area efficiency and competitive energy efficiency, the architecture according to an example embodiment is well suited for low-cost and energy-constrained systems where the cryptographic core area is fully reused for key generation.

Embodiments of the present invention can have one or more of the following features and associated advantages:

| Feature | Benefit/Advantage |
| --- | --- |
| Multiple unified function approach for dynamic entropy generation, extraction and utilization within same hardware (i.e., unified TRNG and cryptographic core) | Dynamic entropy unification method and system according to example embodiments provides the following advantages: Data locality and silicon area (resources) reuse ensures high energy (and area) efficiency with attack robustness against memory/bus attacks In-logic obfuscation leads to high resistance against major class of physical attacks |
| Fully synthesizable and all-digital based hardware design approach without calibration | Fully synthesizable design approach without any calibration effort according to example embodiments reduces design effort leading to low-cost and lesser time-to-market All-digital method and system according to example embodiments provides the usage of commercially available digital standard cells libraries from leading foundry vendors and supports seamless scaling across process (technology) generations. |

Embodiments of the present invention uniquely unify dynamic entropy generation with inherent extraction and utilization of true random numbers inside cryptographic core.

Embodiments of the present invention require smaller silicon area, energy compared to state-of-the-art solutions.

Embodiments of the present invention provide data locality and inherent obfuscation at no overhead, thereby improving the resistance to the very common and advanced physical attacks on secure Systems-on-chip.

Embodiments of the present invention are based on using the commercially available digital design flow (i.e., fully-synthesizable design) and all-digital design approach significantly reduces the development cost across product generations implemented in different process (technology) nodes.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g., a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] I. Verbauwhede, J. Balasch, S. S. Roy and A. Van Herrewege, "Circuit challenges from cryptography," in *ISSCC Dig. Tech. Papers*, February 2015, pp. 1-2.

[2] C. Paar, J. Pelzl, *Understanding Cryptography*, Springer, 2010, page numbers 34 to 41.

[3] S. K. Satpathy et al., "An All-Digital Unified Physically Unclonable Function and True Random Number Generator Featuring Self-Calibrating Hierarchical Von Neumann Extraction in 14-nm Tri-gate CMOS," in *IEEE Journal of Solid-State Circuits*, vol. 54, no. 4, pp. 1074-1085, April 2019.

[4] V. R. Pamula, X. Sun, S. Kim, F. U. Rahman, B. Zhang, V. S. Sathe, "An All-Digital True-Random-Number Generator with Integrated De-correlation and Bias Correction at 3.2-to-86 Mb/S, 2.58 pJ/Bit in 65-NM CMOS," 2018 *IEEE Symposium on VLSI Circuits*, Honolulu, HI, 2018, pp. 1-2.

[5] M. Kim, U. Ha, K. J. Lee, Y. Lee, H.-J. Yoo, "A 82-nW Chaotic Map True Random Number Generator Based on a Sub-Ranging SAR ADC," in *IEEE Journal of Solid-State Circuits*, vol. 52, no. 7, pp. 1953-1965, July 2017.

[6] E. Kim, M. Lee, J. Kim, "8 Mb/s 28 Mb/mJ robust true-random-number generator in 65 nm CMOS based on differential ring oscillator with feedback resistors," in *ISSCC Dig. Tech. Papers, February* 2017, pp. 144-145.

[7] K. Yang, D. Blaauw and D. Sylvester, "An All-Digital Edge Racing True Random Number Generator Robust Against PVT Variations," in *IEEE Journal of Solid-State Circuits*, vol. 51, no. 4, pp. 1022-1031, April 2016.

[8] K. Yang et al., "True random number generator," U.S. Pat. No. 9,335,972 B2, May. 10, 2016.

[9] K. Yang, D. Fick, M. B. Henry, Y. Lee, D. Blaauw and D. Sylvester, "16.3 A 23 Mb/s 23pJ/b fully synthesized true-random-number generator in 28 nm and 65 nm CMOS," in *ISSCC Dig. Tech. Papers*, February 2014, pp. 280-281.
[10] S. K. Mathew et al., "Random number generator," U.S. Pat. No. 9,928,036 B2, Mar. 27, 2018.
[11] S. K. Mathew et al., "µRNG: A 300-950 mV, 323 Gbps/W All-Digital Full-Entropy True Random Number Generator in 14 nm FinFET CMOS," in *IEEE Journal of Solid-State Circuits*, vol. 51, no. 7, pp. 1695-1704, July 2016.
[12] S. Satpathy et al., "Apparatus and method for generating hybrid static/dynamic entropy physically unclonable function," US Pat. No. US 2019/0305970 A1, Oct. 3, 2019.
[13] L. E. Bassham, A. L. Rukhin, J. Soto et al., "A Statistical Test Suite for Random and Pseudorandom Number Generators for Cryptographic Applications," NIST Special Publication 800-22A, 2010.
[14] M. S. Turan, E. Barker, J. Kelsey et al., "Recommendation for the Entropy Sources Used for Random Bit Generation," NIST Special Publication 800-90B, 2018.
[15] N. Weste, D. Harris, *CMOS VLSI Design* (4th edition), Pearson Education 2011.
[16] H. Cramer, *Mathematical Methods of Statistics*. Princeton, NJ, USA: Princeton Univ. Press, 1946, ISBN 0-691-08004-6, page Number 282, second paragraph.
[17] S. T. Chandrasekaran, V. E. G. Karnam and A. Sanyal, "0.36-mW, 52-Mbps True Random Number Generator Based on a Stochastic Delta-Sigma Modulator," *IEEE Solid-State Circuits Letters*, vol. 3, pp. 190-193, March 2020.

The invention claimed is:

1. A method of generating true random numbers for use by a cryptographic hardware component for cryptographic algorithms or communication protocols, the method comprising the steps of:
controlling a clock pulsewidth, PW, for pulsed-latch clocking in the cryptographic hardware component to switch between using the cryptographic hardware component to generate the true random numbers in a first operating state; and
using the cryptographic hardware component for cryptographic processing other than generating true random numbers in a second operating state.

2. The method of claim 1, wherein using the cryptographic hardware component to generate the true random numbers in the first operating state comprises exploiting hold-margin in pulsed latch pipelines of the cryptographic hardware component via clock pulsewidth overstretching.

3. The method of claim 1, wherein controlling the PW comprises controlling the PW to be smaller than a hold violation window in the cryptographic hardware component during the second operating state.

4. The method of claim 1, wherein controlling the PW comprises controlling the PW to be larger than the hold violation window in the cryptographic hardware component during the first operating state.

5. The method of claim 4, wherein controlling the PW comprises controlling the PW to be larger than the hold violation window and larger than a minimum loop delay in the cryptographic hardware component during the first operating state.

6. The method of claim 5, wherein controlling the PW comprises controlling the PW to be larger than a threshold multiple of the minimum loop delay in the cryptographic hardware component during the first operating state.

7. The method of claim 5, wherein the threshold multiple comprises a nominal clock pulsewidth plus a hold margin to increase the combinational min-delay.

8. The method of claim 4, wherein PW is controlled to be any value greater than 32 F01, wherein F01 is an inverter delay with a fan-out of one for a given design technology.

9. The method of claim 8, wherein PW is controlled to be 64 F01.

10. The method of claim 8, wherein PW is controlled to be 256 F01.

11. A cryptographic hardware component for cryptographic algorithms or communication protocols, the cryptographic hardware component configured for controlling a clock pulsewidth, PW, for pulsed-latch clocking in the cryptographic hardware component to switch between using the cryptographic hardware component to generate true random numbers in a first operating state, and using the cryptographic hardware component for cryptographic processing other than generating true random numbers in a second operating state.

12. The cryptographic hardware component of claim 11, configured for generating the true random numbers in the first operating state by exploiting hold-margin in pulsed latch pipelines of the cryptographic hardware component via clock pulsewidth overstretching.

13. The cryptographic hardware component of claim 11, configured for controlling the PW to be smaller than a hold violation window in the cryptographic hardware component during the second operating state.

14. The cryptographic hardware component of claim 11, configured for controlling the PW to be larger than the hold violation window in the cryptographic hardware component during the first operating state.

15. The cryptographic hardware component of claim 14, configured for controlling the PW to be larger than the hold violation window and larger than the minimum loop delay in the cryptographic hardware component during the first operating state.

16. The cryptographic hardware component of claim 15, configured for controlling the PW to be larger than the threshold multiple of the minimum loop delay in the cryptographic hardware component during the first operating state.

17. The cryptographic hardware component of claim 15, wherein the threshold multiple comprises a nominal clock pulsewidth plus a hold margin to increase the combinational min-delay.

18. The cryptographic hardware component of claim 14, wherein PW is controlled to be any value greater than 32 F01, wherein F01 is an inverter delay with a fan-out of one for a given design technology.

19. The cryptographic hardware component of claim 18, wherein PW is controlled to be 64 F01.

20. The cryptographic hardware component of claim 18, wherein PW is controlled to be 256 F01.

* * * * *